United States Patent
Park et al.

(10) Patent No.: US 11,240,688 B2
(45) Date of Patent: *Feb. 1, 2022

(54) OVER-THE-AIR INTERFERENCE COORDINATION AMONG BASE STATIONS

(71) Applicant: QUALCOMM Incorporated, San Diego, CA (US)

(72) Inventors: Sungwoo Park, San Diego, CA (US); Arumugam Chendamarai Kannan, San Diego, CA (US); Tao Luo, San Diego, CA (US); Xiaoxia Zhang, San Diego, CA (US); Jing Sun, San Diego, CA (US); Srinivas Yerramalli, San Diego, CA (US); Vinay Chande, San Diego, CA (US); Olufunmilola Omolade Awoniyi-Oteri, San Diego, CA (US); Sony Akkarakaran, Poway, CA (US); Mostafa Khoshnevisan, San Diego, CA (US); Zhifei Fan, San Diego, CA (US); Kaushik Chakraborty, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/893,270

(22) Filed: Jun. 4, 2020

(65) Prior Publication Data

US 2020/0396621 A1 Dec. 17, 2020

Related U.S. Application Data

(60) Provisional application No. 62/860,736, filed on Jun. 12, 2019.

(51) Int. Cl.
*H04W 24/02* (2009.01)
*H04W 72/12* (2009.01)
*H04B 17/336* (2015.01)

(52) U.S. Cl.
CPC .......... *H04W 24/02* (2013.01); *H04B 17/336* (2015.01); *H04W 72/121* (2013.01)

(58) Field of Classification Search
CPC ... H04B 17/336; H04W 24/02; H04W 72/121
(Continued)

(56) References Cited

U.S. PATENT DOCUMENTS

2011/0136494 A1 6/2011 Kim et al.
2012/0014333 A1\* 1/2012 Ji .......................... H04L 5/0062
370/329

(Continued)

OTHER PUBLICATIONS

International Search Report and Written Opinion—PCT/US2020/036283—ISAEPO—dated Sep. 7, 2020.
(Continued)

*Primary Examiner* — Gbemileke J Onamuti
(74) *Attorney, Agent, or Firm* — Holland & Hart LLP

(57) ABSTRACT

Methods, systems, and devices for wireless communications are described. In some systems, transmissions from a neighboring base station may interfere with downlink transmissions from a serving base station to a target user equipment (UE). To coordinate interference between the base stations (e.g., mitigate interference, stabilize interference, etc.), the serving base station may generate an interference coordination message and may transmit the message over-the-air (OTA) to one or more neighboring base stations. The message may include parameters indicating a coordination scheme for the neighboring base station(s) to use for modifying one or more scheduling decisions. The coordination scheme may be configured or dynamically selected and may include interfering beam fixation, interfering beam suppres- (Continued)

sion, or interfering beam avoidance. A neighboring base station receiving the OTA interference coordination message may modify a scheduling decision to mitigate or stabilize interference when the serving base station is transmitting to the target UE.

30 Claims, 16 Drawing Sheets

(58) Field of Classification Search
USPC .......................................................... 370/252
See application file for complete search history.

(56) References Cited

U.S. PATENT DOCUMENTS

| 2013/0194950 A1 | 8/2013 | Haghighat et al. |
| 2014/0018082 A1 | 1/2014 | Cheng et al. |
| 2016/0269087 A1 | 9/2016 | Subramanian et al. |
| 2017/0171839 A1* | 6/2017 | Larijani .............. H04W 74/008 |
| 2019/0306852 A1* | 10/2019 | Nayeb Nazar .... H04W 72/0413 |
| 2020/0145153 A1* | 5/2020 | Ma ......................... H04B 7/024 |
| 2020/0383118 A1* | 12/2020 | Park ...................... H04W 24/08 |

OTHER PUBLICATIONS

LG Electronics: "Discussion on Beam Coordination for Duplexing Flexibility", 3GPP Draft, 3GPP TSG RAN WG1 Meeting #88bis, R1-1704936 Discussion on Beam Coordination for Duplexing Flexibility, 3rd Generation Partnership Project (3GPP), Mobile Competence Centre, 650, Route Des Lucioles, F-06921 Sophia-Antipol, vol. RAN WG1, No. Spokane, USA, Apr. 3, 2017-Apr. 7, 2017, Apr. 2, 2017 (Apr. 2, 2017), XP051243070, 4 Pages, Retrieved from the Internet: URL: http://www.3gpp.org/ftp/Meetings_3GPP_SYNC/RAN1/Docs/, [retrieved on Apr. 2, 2017], Sections 2.1 and 2.2.

* cited by examiner

OVER-THE-AIR INTERFERENCE COORDINATION AMONG BASE STATIONS

CROSS REFERENCE

The present Application for Patent claims the benefit of U.S. Provisional Patent Application No. 62/860,736 by PARK et al., entitled "OVER-THE-AIR INTERFERENCE COORDINATION AMONG BASE STATIONS," filed Jun. 12, 2019, assigned to the assignee hereof, and expressly incorporated by reference herein.

INTRODUCTION

The following relates to wireless communications and more specifically to interference coordination.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method for wireless communications at a first base station is described. The method may include determining to transmit an interference coordination message based on a communication parameter of a UE served by the first base station. The method may also include dynamically selecting an interference coordination scheme for at least a second base station based on the communication parameter. The method may further include generating the interference coordination message based on the interference coordination scheme and a scheduling decision for the first base station. The method may also include transmitting the generated interference coordination message to at least the second base station.

An apparatus for wireless communications at a first base station is described. The apparatus may include a processor and memory coupled to the processor, the processor and memory configured to determine to transmit an interference coordination message based on a communication parameter of a UE served by the first base station. The processor and memory may also be configured to dynamically select an interference coordination scheme for at least a second base station based on the communication parameter. The processor and memory may further be configured to generate the interference coordination message based on the interference coordination scheme and a scheduling decision for the first base station. The processor and memory may also be configured to transmit the generated interference coordination message to at least the second base station.

Another apparatus for wireless communications at a first base station is described. The apparatus may include means for determining to transmit an interference coordination message based on a communication parameter of a UE served by the first base station. The apparatus may also include means for dynamically selecting an interference coordination scheme for at least a second base station based on the communication parameter. The apparatus may further include means for generating the interference coordination message based on the interference coordination scheme and a scheduling decision for the first base station. The apparatus may also include means for transmitting the generated interference coordination message to at least the second base station.

A non-transitory computer-readable medium storing code for wireless communications at a first base station is described. The code may include instructions executable by a processor to determine to transmit an interference coordination message based on a communication parameter of a UE served by the first base station. The code may also include instructions executable by the processor to dynamically select an interference coordination scheme for at least a second base station based on the communication parameter. The code may further include instructions executable by the processor to generate the interference coordination message based on the interference coordination scheme and a scheduling decision for the first base station. The code may also include instructions executable by the processor to transmit the generated interference coordination message to at least the second base station.

In some examples of the method, apparatuses, and non-transitory computer-readable medium described herein, transmitting the generated interference coordination message may include operations, features, means, or instructions for broadcasting the generated interference coordination message to a set of base stations within a receiving range of the first base station, the set of base stations including at least the second base station. In some other examples of the method, apparatuses, and non-transitory computer-readable medium described herein, transmitting the generated interference coordination message may include operations, features, means, or instructions for unicasting the generated interference coordination message to a designated base station group including at least the second base station.

In some examples of the method, apparatuses, and non-transitory computer-readable medium described herein, generating the interference coordination message may include operations, features, means, or instructions for generating a payload of the interference coordination message based on the interference coordination scheme or the scheduling decision for the first base station or both. In some such examples, the payload includes an indication of the interference coordination scheme, or a trigger for interference coordination, or a start time for interference coordination, or an end time for interference coordination, or a time duration for interference coordination, or a beam fixation time period for at least the second base station, or a frequency resource for transmission by the first base station, or a transmit power level for at least the second base station, or a transmit power reduction level for at least the second base station, or a UE priority value for the UE, or a data traffic priority value for the UE, or a cell identifier for the first base station, or a base station identifier for the first base station, or a transmission/reception point identifier for the first base station, or one or more beam indexes, or a combination thereof.

In some examples of the method, apparatuses, and non-transitory computer-readable medium described herein, transmitting the generated interference coordination message may include operations, features, means, or instructions for transmitting the generated interference coordination message via a wireless backhaul link, or an uplink channel, or a downlink channel, or a combination thereof. In some examples of the method, apparatuses, and non-transitory computer-readable medium described herein, the generated interference coordination message may be transmitted based on a duplex capability of the first base station or a duplex capability of the second base station or both.

In some examples of the method, apparatuses, and non-transitory computer-readable medium described herein, the communication parameter may be an example of a quality of service (QoS) level for a downlink transmission to the UE, and the method, apparatuses, and non-transitory computer-readable medium described herein may further include operations, features, means, or instructions for identifying that the QoS level for the downlink transmission to the UE is greater than a threshold QoS level, where determining to transmit the interference coordination message may be based on the identifying.

In some examples of the method, apparatuses, and non-transitory computer-readable medium described herein, the communication parameter may be an example of a priority value for the UE, and the method, apparatuses, and non-transitory computer-readable medium described herein may further include operations, features, means, or instructions for identifying that the priority value for the UE is greater than a threshold priority value, where the determining to transmit the interference coordination message may be based on the identifying.

In some examples of the method, apparatuses, and non-transitory computer-readable medium described herein, the communication parameter may be an example of a signal-to-interference ratio (SIR) or a signal-to-interference-plus-noise ratio (SINR) or both for the UE. In some such examples, the method, apparatuses, and non-transitory computer-readable medium described herein may further include operations, features, means, or instructions for identifying that the SIR or the SINR or both for the UE is less than one or more threshold values, where the determining to transmit the interference coordination message may be based on the identifying.

In some examples of the method, apparatuses, and non-transitory computer-readable medium described herein, the communication parameter may be an example of location information for the UE, and the method, apparatuses, and non-transitory computer-readable medium described herein may further include operations, features, means, or instructions for identifying that the UE is greater than a threshold distance away from the first base station based on the location information, where the determining to transmit the interference coordination message may be based on the identifying.

Some examples of the method, apparatuses, and non-transitory computer-readable medium described herein may further include operations, features, means, or instructions for communicating with the UE according to the scheduling decision.

A method for wireless communications at a device in a wireless network is described. The method may include determining a communication parameter of a UE served by a serving base station or of the serving base station or of both. The method may also include dynamically selecting an interference coordination scheme for the serving base station and one or more neighboring base stations based on the communication parameter. The method may further include transmitting an indication of the dynamically selected interference coordination scheme to a base station.

An apparatus for wireless communications at a device in a wireless network is described. The apparatus may include a processor and memory coupled to the processor, the processor and memory configured to determine a communication parameter of a UE served by a serving base station or of the serving base station or of both. The processor and memory may also be configured to dynamically select an interference coordination scheme for the serving base station and one or more neighboring base stations based on the communication parameter. The processor and memory may further be configured to transmit an indication of the dynamically selected interference coordination scheme to a base station.

Another apparatus for wireless communications at a device in a wireless network is described. The apparatus may include means for determining a communication parameter of a UE served by a serving base station or of the serving base station or of both. The apparatus may also include means for dynamically selecting an interference coordination scheme for the serving base station and one or more neighboring base stations based on the communication parameter. The apparatus may further include means for transmitting an indication of the dynamically selected interference coordination scheme to a base station.

A non-transitory computer-readable medium storing code for wireless communications at a device in a wireless network is described. The code may include instructions executable by a processor to determine a communication parameter of a UE served by a serving base station or of the serving base station or of both. The code may also include instructions executable by the processor to dynamically select an interference coordination scheme for the serving base station and one or more neighboring base stations based on the communication parameter. The code may further include instructions executable by the processor to transmit an indication of the dynamically selected interference coordination scheme to a base station.

In some examples of the method, apparatuses, and non-transitory computer-readable medium described herein, the dynamically selected interference coordination scheme may be an example of an interfering beam fixation scheme and transmitting the indication of the dynamically selected interference coordination scheme may include operations, features, means, or instructions for transmitting an indication of a beam fixation time interval or a beam fixation periodicity or both for the interfering beam fixation scheme.

In some examples of the method, apparatuses, and non-transitory computer-readable medium described herein, the dynamically selected interference coordination scheme may be an example of an interfering beam suppression scheme and transmitting the indication of the dynamically selected interference coordination scheme may include operations, features, means, or instructions for transmitting an indication of a transmit power level or a transmit power reduction level or both for the interfering beam suppression scheme.

In some examples of the method, apparatuses, and non-transitory computer-readable medium described herein, the dynamically selected interference coordination scheme may be an example of an interfering beam avoidance scheme and transmitting the indication of the dynamically selected interference coordination scheme may include operations, features, means, or instructions for transmitting an indication of one or more beam indices to avoid for the interfering beam avoidance scheme.

In some examples of the method, apparatuses, and non-transitory computer-readable medium described herein, transmitting the indication of the dynamically selected interference coordination scheme may include operations, features, means, or instructions for transmitting an indication of whether to implement the dynamically selected interference coordination scheme, or a start time for implementing the dynamically selected interference coordination scheme, or an end time for implementing the dynamically selected interference coordination scheme, or a combination thereof.

In some examples of the method, apparatuses, and non-transitory computer-readable medium described herein, the communication parameter includes a QoS level for a downlink transmission from the serving base station to the UE, or a priority value for the UE, or an SIR for the UE, or an SINR for the UE, or location information for the UE relative to the serving base station, or a combination thereof.

In some examples of the method, apparatuses, and non-transitory computer-readable medium described herein, the device in the wireless network may be an example of a network entity and the base station may be an example of the serving base station, and the determining the communication parameter may include operations, features, means, or instructions for receiving the communication parameter from the serving base station.

In some examples of the method, apparatuses, and non-transitory computer-readable medium described herein, the device in the wireless network may be an example of the serving base station and transmitting the indication of the dynamically selected interference coordination scheme to the base station may include operations, features, means, or instructions for transmitting an interference coordination message to the one or more neighboring base stations, where a payload of the interference coordination message may be based on the dynamically selected interference coordination scheme.

A method for wireless communications at a first base station is described. The method may include receiving an interference coordination message from a second base station. The method may also include determining a dynamically selected interference coordination scheme based on the interference coordination message. The method may also include modifying a scheduling decision based on the dynamically selected interference coordination scheme. The method may further include communicating with one or more UEs according to the modified scheduling decision.

An apparatus for wireless communications at a first base station is described. The apparatus may include a processor and memory coupled to the processor, the processor and memory configured to receive an interference coordination message from a second base station. The processor and memory may also be configured to determine a dynamically selected interference coordination scheme based on the interference coordination message. The processor and memory may also be configured to modify a scheduling decision based on the dynamically selected interference coordination scheme. The processor and memory may further be configured to communicate with one or more UEs according to the modified scheduling decision.

Another apparatus for wireless communications at a first base station is described. The apparatus may include means for receiving an interference coordination message from a second base station. The apparatus may also include means for determining a dynamically selected interference coordination scheme based on the interference coordination message. The apparatus may also include means for modifying a scheduling decision based on the dynamically selected interference coordination scheme. The apparatus may further include means for communicating with one or more UEs according to the modified scheduling decision.

A non-transitory computer-readable medium storing code for wireless communications at a first base station is described. The code may include instructions executable by a processor to receive an interference coordination message from a second base station. The code may also include instructions executable by the processor to determine a dynamically selected interference coordination scheme based on the interference coordination message. The code may also include instructions executable by the processor to modify a scheduling decision based on the dynamically selected interference coordination scheme. The code may further include instructions executable by the processor to communicate with one or more UEs according to the modified scheduling decision.

Some examples of the method, apparatuses, and non-transitory computer-readable medium described herein may further include operations, features, means, or instructions for determining an interference coordination scheme based on the interference coordination message, where the scheduling decision may be modified based on the interference coordination scheme.

In some examples of the method, apparatuses, and non-transitory computer-readable medium described herein, the interference coordination scheme may be an example of an interfering beam fixation scheme, and modifying the scheduling decision may include operations, features, means, or instructions for operating using each communication beam of a set of communication beams for a configured number of transmission time intervals (TTIs) based on a beam fixation time interval or a beam fixation periodicity or both indicated by the interference coordination message. In some examples of the method, apparatuses, and non-transitory computer-readable medium described herein, the set of communication beams includes a subset of a set of communication beams operated by the first base station.

In some examples of the method, apparatuses, and non-transitory computer-readable medium described herein, the interference coordination scheme may be an example of an interfering beam suppression scheme, and modifying the scheduling decision may include operations, features, means, or instructions for modifying a transmit power for a set of communication beams based on a second scheduling decision for the second base station.

In some examples of the method, apparatuses, and non-transitory computer-readable medium described herein, modifying the transmit power for the set of communication beams may include operations, features, means, or instructions for reducing the transmit power to zero, or to a transmit power level indicated by the interference coordination message, or by a transmit power reduction level indicated by the interference coordination message for the set of communication beams based on the interference coordination scheme.

In some examples of the method, apparatuses, and non-transitory computer-readable medium described herein, modifying the transmit power for the set of communication beams may include operations, features, means, or instructions for determining one or more TTIs in which the second base station may be scheduled to transmit to a specific UE according to the second scheduling decision, where the transmit power for the set of communication beams may be modified for the one or more TTIs.

In some examples of the method, apparatuses, and non-transitory computer-readable medium described herein, the set of communication beams includes a subset of a set of communication beams operated by the first base station.

In some examples of the method, apparatuses, and non-transitory computer-readable medium described herein, the interference coordination scheme may be an example of an interfering beam avoidance scheme, and modifying the scheduling decision may include operations, features, means, or instructions for refraining from operating using a set of communication beams based on a second scheduling decision for the second base station.

Some examples of the method, apparatuses, and non-transitory computer-readable medium described herein may further include operations, features, means, or instructions for determining the set of communication beams based on a cell identifier for the second base station, or a base station identifier for the second base station, or a transmission/reception point identifier for the second base station, or one or more beam indexes, or a combination thereof indicated by the interference coordination message.

In some examples of the method, apparatuses, and non-transitory computer-readable medium described herein, refraining from operating using the set of communication beams may include operations, features, means, or instructions for determining one or more TTIs in which the second base station may be scheduled to transmit to a specific UE according to the second scheduling decision. In some such examples, the method, apparatuses, and non-transitory computer-readable medium described herein may further include operations, features, means, or instructions for operating using a second set of communication beams distinct from the set of communication beams for the one or more TTIs.

In some examples of the method, apparatuses, and non-transitory computer-readable medium described herein, the set of communication beams includes a subset of a set of communication beams operated by the first base station.

In some examples of the method, apparatuses, and non-transitory computer-readable medium described herein, receiving the interference coordination message may include operations, features, means, or instructions for receiving the interference coordination message via a wireless backhaul link, or an uplink channel, or a downlink channel, or a combination thereof.

A method for wireless communications at a UE is described. The method may include receiving a message from a serving base station including an indication of a dynamically selected interference coordination scheme and an indication of a scheduling decision. The method may also include transmitting an interference coordination message indicating the dynamically selected interference coordination scheme and the scheduling decision to at least a neighboring base station. The method may further include communicating with the serving base station based on the scheduling decision.

An apparatus for wireless communications at a UE is described. The apparatus may include a processor and memory coupled to the processor, the processor and memory configured to receive a message from a serving base station including an indication of a dynamically selected interference coordination scheme and an indication of a scheduling decision. The processor and memory may be further configured to transmit an interference coordination message indicating the dynamically selected interference coordination scheme and the scheduling decision to at least a neighboring base station. The processor and memory may also be configured to communicate with the serving base station based on the scheduling decision.

Another apparatus for wireless communications at a UE is described. The apparatus may include means for receiving a message from a serving base station including an indication of a dynamically selected interference coordination scheme and an indication of a scheduling decision. The apparatus may also include means for transmitting an interference coordination message indicating the dynamically selected interference coordination scheme and the scheduling decision to at least a neighboring base station. The apparatus may further include means for communicating with the serving base station based on the scheduling decision.

A non-transitory computer-readable medium storing code for wireless communications at a UE is described. The code may include instructions executable by a processor to receive a message from a serving base station including an indication of a dynamically selected interference coordination scheme and an indication of a scheduling decision. The code may also include instructions executable by the processor to transmit an interference coordination message indicating the dynamically selected interference coordination scheme and the scheduling decision to at least a neighboring base station. The code may further include instructions executable by the processor to communicate with the serving base station based on the scheduling decision.

Some examples of the method, apparatuses, and non-transitory computer-readable medium described herein may further include operations, features, means, or instructions for detecting interference greater than a threshold level of interference from the neighboring base station. In some such examples, the method, apparatuses, and non-transitory computer-readable medium described herein may further include operations, features, means, or instructions for transmitting, to the serving base station, an interference message indicating the detected interference, where receiving the message from the serving base station is based on transmitting the interference message.

In some examples of the method, apparatuses, and non-transitory computer-readable medium described herein, receiving the message from the serving base station may include operations, features, means, or instructions for receiving, from the serving base station, downlink control information (DCI) notifying the UE to transmit the interference coordination message to at least the neighboring base station, where transmitting the interference coordination message is based on the DCI.

In some examples of the method, apparatuses, and non-transitory computer-readable medium described herein, receiving the message from the serving base station may include operations, features, means, or instructions for receiving, from the serving base station, the interference coordination message. In some such examples of the method, apparatuses, and non-transitory computer-readable medium described herein, transmitting the interference coordination message may include operations, features, means, or instructions for relaying the interference coordination message from the serving base station to at least the neighboring base station.

DETAILED DESCRIPTION

Figure 1:
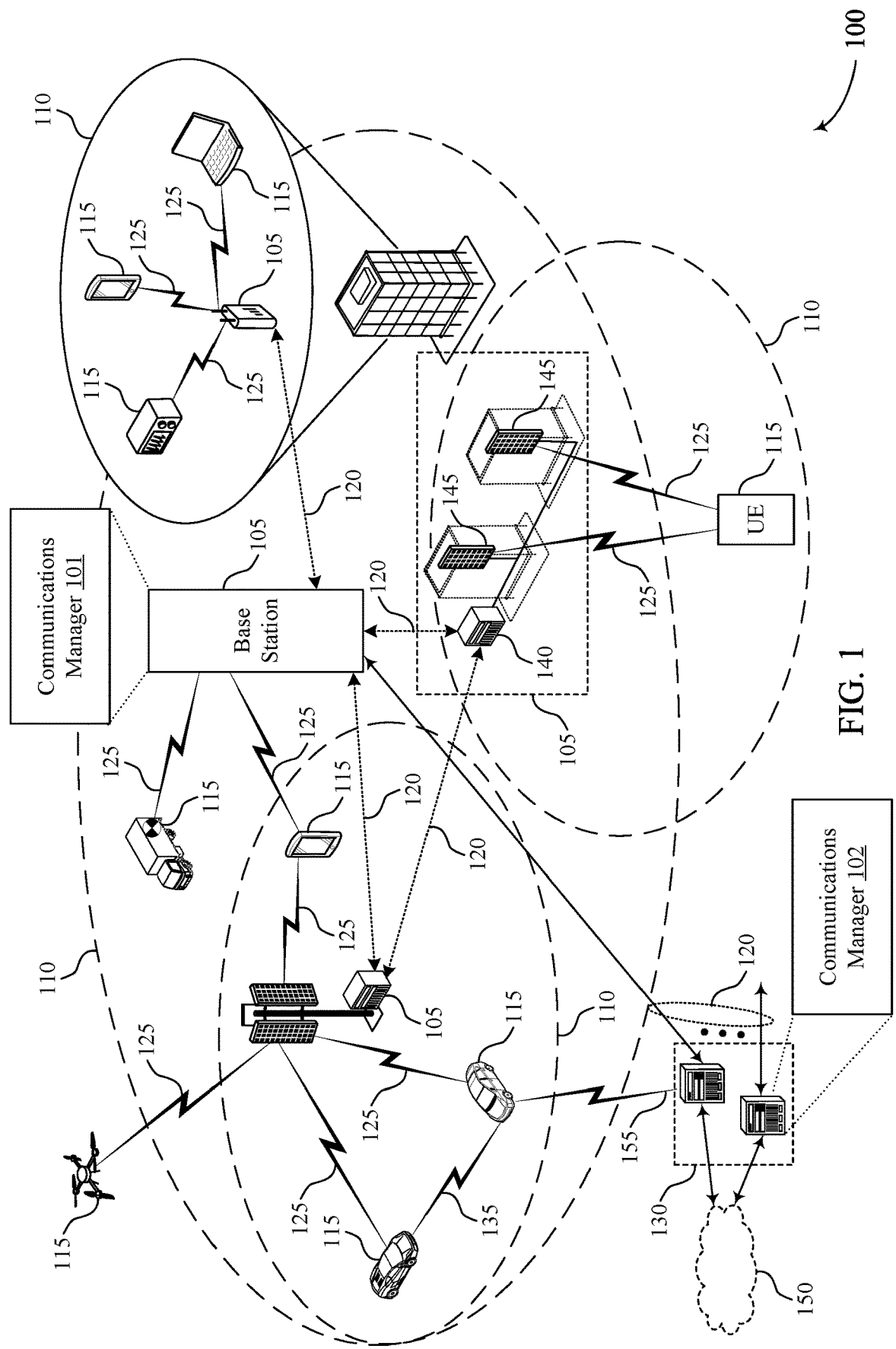
FIGS. 1 and 2 illustrate examples of wireless communications systems that support over-the-air (OTA) interference coordination among base stations in accordance with one or more aspects of the present disclosure.

In wireless communications systems implementing beamforming, base stations may make scheduling decisions to determine how to communicate in different TTIs. For example, a base station may determine a UE with which to communicate and a communication beam (e.g., corresponding to a particular beam index) to use for the communications in each TTI. In some implementations, different base stations in a system may perform independent scheduling (e.g., without coordination), where the scheduling decisions of a first base station are independent of the scheduling decisions of a second base station. Such independent scheduling may result in interference between scheduled communications. For example, two base stations may transmit concurrently to UEs within a close physical proximity to one another, such that each UE may experience interference from the transmission sent to the other UE. In some other implementations, the base stations in a system may be scheduled by a centralized scheduler in a joint scheduling process with coordination, where the base stations are connected (e.g., to each other, via the centralized scheduler, etc.) by an ideal backhaul link (i.e., a backhaul link with zero or negligible delay, such as a wireline backhaul link or a fiber access backhaul link). However, in some systems, one or more base stations may be connected via non-ideal backhaul links (e.g., backhaul links involving some delay in communications, such as wireless backhaul links).

If the base stations in a system are connected via non-ideal backhaul links (or are not connected via backhaul links), the base stations may transmit coordination information OTA. For example, base stations may implement OTA interference coordination messaging to coordinate scheduling decisions and mitigate and/or stabilize interference. A base station serving a UE may determine to transmit an interference coordination message to one or more neighboring base stations based on one or more communication parameters for the UE. The base station may generate the interference coordination message and may transmit the interference coordination message to the one or more neighboring base stations. The neighboring base stations receiving the message may modify scheduling decisions to mitigate and/or stabilize interference during TTIs in which the serving base station transmits to the UE. Modifying scheduling based on OTA interference coordination may support improved reliability for transmissions from the serving base station to the UE.

In some cases, the interference coordination message may indicate an interference coordination scheme. In some implementations, the serving base station may be configured with a static scheme for coordination. In other implementations, the serving base station or a network device communicating with the serving base station may dynamically select a scheme from a set of supported schemes for coordination. In a first example, the coordination scheme may be a beam fixation scheme. In beam fixation, the base stations may refrain from switching communication beams for configured time intervals to stabilize interference and support improved rate control. In a second example, the coordination scheme may be a beam suppression scheme. In beam suppression, a neighboring base station may refrain from transmitting (or reduce transmitting power) during TTIs when the serving base station is transmitting to the target UE, mitigating interference to the target UE. In a third example, the coordination scheme may be a beam avoidance scheme. In beam avoidance, a neighboring base station may refrain from transmitting on one or more specific communication beams (e.g., transmit beams) based on the communication beams being used by the serving base station in each TTI. This beam avoidance scheme may mitigate interference to the UEs in the system.

Aspects of the disclosure are initially described in the context of wireless communications systems. Additional aspects of the disclosure are described with reference to scheduling decisions and a process flow. Aspects of the disclosure are further illustrated by and described with reference to apparatus diagrams, system diagrams, and flowcharts that relate to OTA interference coordination among base stations.

FIG. 1 illustrates an example of a wireless communications system 100 that supports OTA interference coordination among base stations in accordance with one or more aspects of the present disclosure. The wireless communications system 100 may include base stations 105, UEs 115, and a core network 130. In some examples, the wireless communications system 100 may be an LTE network, an LTE-A network, an LTE-A Pro network, or an NR network. In some cases, the wireless communications system 100 may support enhanced broadband communications, ultra-reliable (e.g., mission critical) communications, low latency communications, communications with low-cost and low-complexity devices, or any combination thereof.

Base stations 105 may be dispersed throughout a geographic area to form the wireless communications system 100 and may be devices in different forms or having different capabilities. Base stations 105 and UEs 115 may wirelessly communicate via one or more communication links 125. Each base station 105 may provide a coverage area 110 over which UEs 115 and the base station 105 may establish communication links 125. The coverage area 110 may be an example of a geographic area over which a base station 105 and a UE 115 support the communication of signals according to one or more radio access technologies.

UEs 115 may be dispersed throughout a coverage area 110 of the wireless communications system 100, and each UE 115 may be stationary, or mobile, or both at different times. UEs 115 may be devices in different forms or having different capabilities. Some example UEs 115 are illustrated in FIG. 1. The UEs 115 described herein may be able to communicate with various types of devices, such as other UEs 115, base stations 105, and/or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with the core network 130 through backhaul links 120 (e.g., via an S1, N2, N3, or other interface). Base stations 105 may communicate with one another over backhaul links 120 (e.g., via an X2, Xn, or other interface) either directly (e.g., directly between base stations 105), or indirectly (e.g., via core network 130), or both. In some examples, backhaul links 120 may be or include one or more wireless links. In some cases, a UE 115 may communicate with the core network 130 through a communication link 155.

One or more of base stations 105 described herein may include or may be referred to by a person of ordinary skill in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, a machine type communications (MTC) device, or the like, which may be implemented in various objects such as appliances, vehicles, meters, or the like.

The UEs 115 described herein may be able to communicate with various types of devices, such as other UEs 115 that may sometimes act as relays as well as base stations 105 and network equipment including macro eNBs or gNBs, small cell eNBs or gNBs, relay base stations, and the like, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting communication links 125. For example, a carrier used for a communication link 125 may include a portion of a radio frequency spectrum band (e.g., a bandwidth part (BWP)) that is operated according to physical layer channels for a given radio access technology (e.g., LTE, LTE-A, LTE-A Pro, NR).

Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

Time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some cases, a frame may be divided into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit of the wireless communications system 100 and may be referred to as a TTI. In some cases, the TTI duration (that is, the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or various combinations thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, exterior spaces between or overlapping with geographic coverage areas 110, or the like.

A macro cell may cover a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to UEs 115 with service subscriptions with the network provider or may provide restricted access to UEs 115 having an association with the small cell (e.g., UEs 115 in a closed subscriber group (CSG), UEs 115 associated with users in a home or office, and the like). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB), or others) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, overlapping geographic coverage areas 110 associated with different technologies may be supported by different base stations 105. The wireless communications system 100 may include, for example, a heterogeneous network in which different types of base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some cases, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some cases, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), a user plane function (UPF)). The control plane entity may manage non-access stratum (NAS) functions such as mobility, authentication, and bearer management for UEs 115 served by base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with UEs 115 through a number of other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, sometimes in the range of 300 megahertz (MHz) to 300 gigahertz (GHz). The region from 300 MHz to 3 GHz may be known as the ultra-high frequency (UHF) region or decimeter band, since the wavelengths range from approximately one decimeter to one meter in length. UHF waves may be blocked or redirected by buildings and environmental features, but the waves may penetrate structures sufficiently for a macro cell to provide service to UEs 115 located indoors. Transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some cases, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, D2D transmissions, or the like.

A base station 105 or UE 115 may be equipped with multiple antennas, which may be used to employ techniques such as transmit diversity, receive diversity, multiple-input multiple-output (MIMO) communications, or beamforming. The antennas of a base station 105 or UE 115 may be located within one or more antenna arrays or antenna panels, which may support MIMO operations or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying certain amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or UE 115 may use beam sweeping techniques as part of beamforming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions and may report to the base station 105 an indication of the signal that the UE 115 received with a highest signal quality, or an otherwise acceptable signal quality.

In some cases, transmissions by a device (e.g., by a base station 105 or UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some wireless communications systems 100, transmissions from a neighboring base station 105 may interfere with downlink transmissions from a serving base station 105 to a target UE 115. To coordinate interference between the base stations 105 (e.g., mitigate interference, stabilize interference, etc.), a communications manager 101 of the serving base station 105 may generate an interference coordination message and may transmit the interference coordination message to one or more neighboring base stations 105. The serving base station 105 may transmit the message on a wireless backhaul link 120, on an uplink channel, or on a downlink channel. The message may include parameters indicating a coordination scheme for the neighboring base station(s) 105 to use for modifying one or more scheduling decisions. The coordination scheme may be configured or dynamically selected and may include interfering beam fixation, interfering beam suppression, or interfering beam avoidance. For example, the serving base station 105 (e.g., using communications manager 101) or a network device (e.g., using communications manager 102) may dynamically select an interference coordination scheme based on a communication parameter of the serving base station 105, the target UE 115, or both. A neighboring base station 105 receiving the OTA interference coordination message, using a communications manager 101, may modify a scheduling decision to mitigate or stabilize interference when the serving base station 105 is transmitting to the target UE 115.

Figure 2:
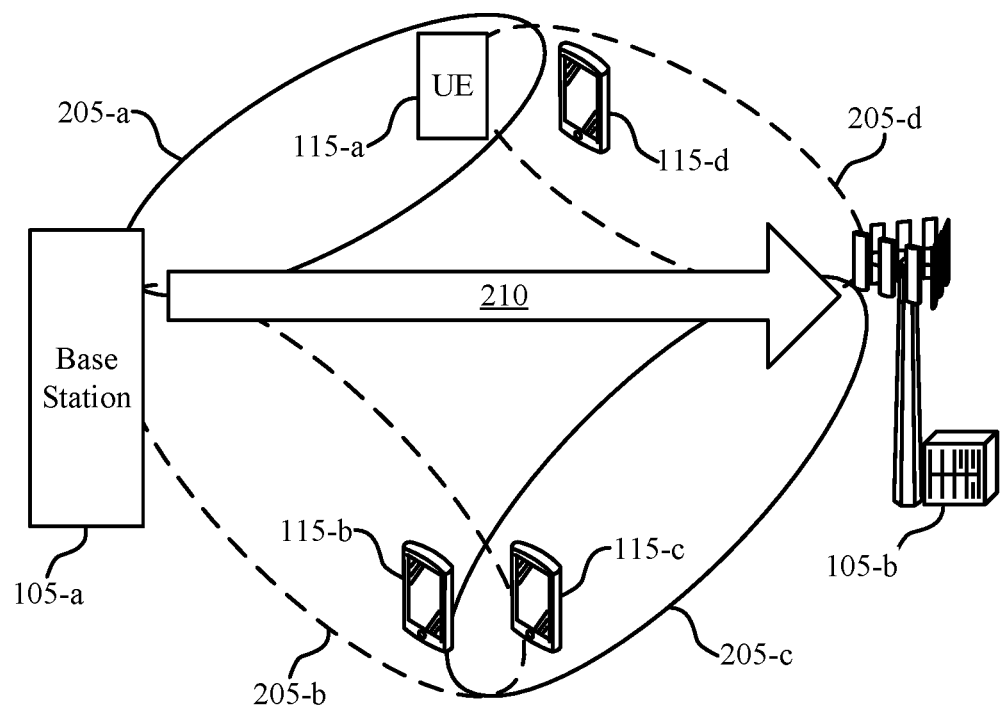

FIG. 2 illustrates an example of a wireless communications system 200 that supports OTA interference coordination among base stations in accordance with one or more aspects of the present disclosure. I In some examples, wireless communications system 200 may implement aspects of wireless communications system 100. For example, wireless communications system 200 may include base stations 105-a and 105-b and UEs 115-a, 115-b, 115-c, and 115-d, which may be examples of the corresponding devices described with reference to FIG. 1. UEs 115-a, 115-b, 115-c, and 115-d may communicate with base stations 105-a and 105-b in a beamforming communication system.

In wireless communications system 200, base stations 105 may communicate information regarding interference coordination using OTA transmissions. Base stations 105 may communicate with UEs 115 using communication beams 205. The communication beams 205 may be examples of transmit beams, receive beams, or a combination thereof (e.g., transmit/receive beams). A serving base station 105 (e.g., base station 105-a serving UEs 115-a and 115-b) may determine scheduling decisions for communicating with the UEs 115 using beamformed communications. For example, according to the scheduling decisions, the serving base station 105-a may use communication beam 205-a to communicate with UE 115-a in a first subset of TTIs and may use communication beam 205-b to communicate with UE 115-b in a second subset of TTIs. Similarly, base station 105-b may communicate with UE 115-c using communication beam 205-c in a first subset of TTIs and may communicate with UE 115-d using communication beam 205-d in a second subset of TTIs.

In some implementations, UE 115-a may experience interference from neighboring base station 105-b that is a different base station 105 than the serving base station for UE 115-a. The interference may be due to signals transmitted by base station 105-b using communication beam 205-d (e.g., in communication with UE 115-d). In some examples, UE 115-a may send a message to neighboring base station 105-b to indicate to neighboring base station 105-b that UE 115-a is experiencing interference, or UE 115-a may send an interference message to serving base station 105-a to indicate to serving base station 105-*a* that UE 115-*a* is experiencing interference. In some examples, UE 115-*a* may transmit a message indicating that UE 115-*a* may experience interference due to a determined synchronization signal block (SSB) configuration of neighboring base station 105-*b*.

Other scheduling decisions may result in interference at one or more UEs 115. For example, UE 115-*b* may experience interference from neighboring base station 105-*b* when monitoring for downlink transmissions from serving base station 105-*a*. The interference may be due to signals transmitted using communication beam 205-*c* by base station 105-*b* in communication with UE 115-*c*. In some examples, UE 115-*c* may experience interference from neighboring base station 105-*a* when monitoring for downlink transmissions from serving base station 105-*b*. The interference may be due to signals transmitted using communication beam 205-*b* by base station 105-*a* in communication with UE 115-*b*. In some examples, UE 115-*d* may experience interference from neighboring base station 105-*a* when monitoring for downlink transmissions from serving base station 105-*b*. The interference may be due to signals transmitted using communication beam 205-*a* by base station 105-*a* in communication with UE 115-*a*.

However, specific scheduling decisions may result in low or no interference for one or more UEs 115 in the wireless communications system 200. In some examples, base station 105-*a* may communicate with UE 115-*a* using communication beam 205-*a* and UE 115-*a* may experience minimal or no interference from base station 105-*b* when base station 105-*b* communicates with UE 115-*c* using communication beam 205-*c* (e.g., based on the locations of UE 115-*a* and UE 115-*c* in the cells). Similarly, UE 115-*c* may also experience minimal or no interference in such a configuration. In some other examples, base station 105-*a* may communicate with UE 115-*b* using communication beam 205-*b* and UE 115-*b* may experience minimal or no interference from base station 105-*b* when base station 105-*b* communicates with UE 115-*d* using communication beam 205-*d*. Similarly, UE 115-*d* may also experience minimal or no interference in such a configuration.

Serving base station 105-*a* may communicate with neighboring base station 105-*b* to coordinate scheduling. Coordinating scheduling may allow the base stations 105 to communicate with the UEs 115 in specific configurations to reduce and/or stabilize interference and avoid "undesirable" cases (e.g., cases where UEs 115 experience significant interference from one or more neighboring base stations 105). In some examples, coordinating scheduling may involve serving base station 105-*a* communicating with potentially interfering base station 105-*b* using OTA interference coordination signaling 210. The OTA interference coordination signaling 210 may include an OTA interference coordination message. In some cases, the OTA interference coordination message may be a standalone message. In other cases, the OTA interference coordination message may be a portion of a larger message (e.g., such as any backhaul message, uplink message, downlink message, etc.).

In some examples, serving base station 105-*a* may determine to send the OTA interference coordination message to neighboring base station 105-*b* based on one or more parameters (i.e., communication parameters). The parameters may include the QoS level of the UE data traffic, the priority of the UE 115, the location or proximity of the UE 115 to the serving base station 105, the link quality (e.g., a measured SINR, a measured SIR, or both) of the communication link between the serving base station 105 and the UE 115, or any combination thereof. In some cases, base station 105-*a* may determine the QoS level of the UE data traffic (e.g., downlink traffic on a physical downlink shared channel (PDSCH)), for example, based on a QoS class identifier (QCI). Base station 105-*a* may compare the QoS level of the PDSCH with a pending transmission to a static or dynamic QoS threshold value. Base station 105-*a* may determine to send the OTA interference coordination message if the QoS level is greater than the QoS threshold value. In some other cases, base station 105-*a* may determine to send the OTA interference coordination message if the UE priority level is above a priority threshold value. The priority level of a UE 115 may be affected by the subscription plan to which the UE 115 belongs. In some examples, a UE 115 may receive a priority value from a base station 105 based on the subscription plan, and the serving base station 105-*a* may determine the priority value for the UE 115 based on a lookup table in memory or based on an indicator received from the UE 115. In yet some other cases, base station 105-*a* may determine to send the OTA interference coordination message based on the link quality of the UE 115. The link quality may be associated with the location of the UE 115 or the proximity of the UE 115 to the serving base station 105-*a*. The location or proximity of the UE 115 may refer to whether the UE 115 is at or near the cell edge of the serving base station 105-*a* (e.g., beyond a threshold distance from the base station 105-*a*). UEs 115 may experience a relatively low SINR and/or a relatively low SIR at or near a cell edge. If a UE 115 measures a low SINR value or low SIR value (e.g., below a threshold SINR value or SIR value) corresponding to a poor link quality, serving base station 105-*a* may determine to transmit the OTA interference coordination message. Additionally or alternatively, serving base station 105-*a* may implement any combination of these or other parameter tests to determine whether to transmit the OTA interference coordination signaling 210.

In some examples, serving base station 105-*a* may send the OTA interference coordination message to neighboring base station 105-*b*. Serving base station 105-*a* may broadcast the interference coordination message to any neighboring base stations 105 within range of the signal, or serving base station 105-*a* may unicast the message to one or more dedicated neighboring base stations (e.g., in a designated base station group). Base station 105-*a* may broadcast to neighboring base stations 105 to coordinate with multiple specific target cells or due to the OTA signal being intended for various target cells or various target communication beams. The interference coordination message may be broadcasted using an omni-beam or by performing a beam sweeping procedure (e.g., using multiple narrow beams). Serving base station 105-*a* may unicast the message to designated neighboring base stations 105 due to the OTA signal being dedicated to specific interfering cells.

In some cases, a UE 115 or base station 105 may determine the contents of the interference coordination message. For example, base station 105-*a* may determine the contents of the interference coordination message based on an interference coordination scheme, the method for message transmission, or both. The interference coordination scheme may include interference beam fixation, interference beam suppression, or interference beam avoidance, as described with reference to FIGS. 3A, 3B, and 3C.

In some examples, a portion of the contents of the interference coordination message may be common to broadcast and unicast messages. The contents may include triggering information, time-related information, frequency-related information, power-related information, priority-related information, or any combination thereof. Triggering information may include an indication to start or stop the interference coordination at the neighboring base station(s) 105. Time-related information may include start and/or end times for the interference coordination, a duration of the coordination, a beam fixation period (e.g., how often to change beams in a beam fixation scheme), or some combination of this information. Frequency-related information may include a BWP, a sub-band index, a subcarrier index, or some combination of these to avoid or to use for transmissions. Power-related information may include a transmit power or a transmit power reduction level for power backoff. For example, in beam suppression, neighboring base station(s) 105 may set the transmit power for one or more beams to the indicated transmit power or may reduce the transmit power by the indicated transmit power reduction level. Priority-related information may include a UE priority value and/or a data traffic priority value (e.g., as described herein).

In some examples, a portion of the contents of the interference coordination message may be applicable to unicast messages. Such contents may be intended for a specific interfering base station 105. In some cases, unicast contents may include cell-related information, beam-related information, or both. Cell-related information may include a cell identifier (ID), a base station ID, a transmission/reception point (TRP) ID, or some combination of these for the interfering base station 105 and/or the serving base station 105. Beam-related information may include beam indexes to avoid or beam indexes used by the serving base station 105. In some cases, the beam-related information may be determined by one or more UEs 115. For example, a UE 115, such as UE 115-a, may determine the beam index for interfering communication beam 205-d and may report the interfering beam index to serving base station 105-a. Serving base station 105-a may include the interfering beam index in an OTA interference coordination message to command neighboring base station 105-b to refrain from using the interfering beam index when serving base station 105-a is transmitting to UE 115-a. In other cases, serving base station 105-a may include an indication of the beam index for communication beam 205-a in the OTA interference coordination message, and neighboring base station 105-b may determine that transmissions on communication beam 205-d may interfere with transmissions on communication beam 205-a and, accordingly, may modify transmissions on communication beam 205-d. Cell-related information and beam-related information may be unicasted to one or more designated neighboring base stations 105, so the neighboring base stations 105 may identify the cell and/or beam information for interference coordination.

In some examples, base station 105-a (i.e., the serving base station for UE 115-a) may generate and send the OTA interference coordination signaling 210. Base station 105-a may send the OTA interference coordination signaling 210 based on a scheduling decision for communication with one or more UEs 115. For example, base station 105-a may indicate scheduling for one or more TTIs, such that a neighboring base station 105 receiving the signaling may modify scheduling decisions in the one or more TTIs based on the scheduling for the serving base station 105-a. In some cases, the OTA interference coordination message may be sent via one or more sidelinks (e.g., wireless backhaul links) between base station 105-a and neighboring base stations 105. In some other cases, base station 105-a may send the OTA interference coordination signaling 210 on an uplink channel to an interfering base station 105 (e.g., base station 105-b) if the serving base station 105-a has full duplex capabilities (e.g., if the serving base station 105-a may transmit on the uplink channel while monitoring for uplink transmissions). In yet other cases, base station 105-a may send the OTA interference coordination signaling 210 on a downlink channel to the interfering base station 105 (e.g., base station 105-b) if the interfering base station 105 has full duplex capabilities (e.g., if the interfering base station 105 may receive on the downlink channel while transmitting downlink transmissions).

In some examples, a UE 115 may send an OTA interference coordination message. Base station 105-a may send DCI to UE 115-a in a downlink transmission to notify UE 115-a to send the OTA interference coordination message. The DCI may indicate some or all the contents to include in the OTA interference coordination message. UE 115-a may send the OTA interference coordination message to base station 105-b in an uplink transmission. UE 115-a may broadcast or unicast the OTA interference coordination message. When broadcasting the OTA interference coordination message, UE 115-a may use an omni-beam, the communication beam used for downlink reception from the serving base station 105-a, and/or a beam sweeping procedure (e.g., sweeping through multiple narrow beams) as the uplink transmit beam for the OTA interference coordination message. Additionally or alternatively, when unicasting the OTA interference coordination message, UE 115-a may use a beam with the greatest signal strength or link quality to communicate with base station 105-b (e.g., the interfering base station 105). In some cases, UE 115-a may use some combination of these beams for broadcast and/or unicast signaling.

In some examples, base station 105-b (e.g., the neighboring base station 105 interfering with UE 115-a) may receive the OTA interference coordination signaling 210 and may perform the interference coordination scheme indicated by the OTA interference coordination message. In some cases, the OTA interference coordination message may indicate beam avoidance of a specific transmit beam. Additionally or alternatively, base station 105-b may avoid interfering with time and/or frequency resources by reducing the transmit power for transmissions on an interfering beam (e.g., reducing the power for transmissions using communication beam 205-d). Base station 105-b may use different beams (e.g., communication beam 205-c) and/or schedule different UEs 115 (e.g., UE 115-c) to avoid interfering with signaling over the communication beam 205-a between base station 105-a and UE 115-a.

In some examples, the OTA interference coordination message may indicate beam fixation or beam suppression and may omit any beam index. Base station 105-b may fix or suppress all transmit beams supported by base station 105-b or a subset of the transmit beams. The relationship between the subset of beams and UE 115-a may be determined semi-statically by using information exchanged between base stations 105-a and 105-b via backhaul links. For example, handover messages between base station 105-a and base station 105-b may indicate to base station 105-b a subset of communication beams 205 that may potentially interfere with transmissions by base station 105-a (e.g., based on transmit and/or receive directions for the handover messaging). Beam suppression, which may be referred to as beam blanking, may include soft or hard blanking. Hard blanking may refer to base station 105-b refraining from transmitting on one or more beams (e.g., by providing zero power for transmission). Soft blanking may refer to reducing the transmit power to a lower level for transmissions on one or more beams.

Base station 105-b may implement a specific interference coordination scheme based on the contents of the OTA interference coordination message. In some cases, this interference coordination scheme may be statically configured for the base stations 105. In some other cases, base station 105-b or a network device (e.g., a base station centralized unit (CU), a network server, etc.) may dynamically switch between the interference coordination schemes to accommodate different interference situations. For example, base stations 105 with lower overhead communication capacities may select beam fixation or beam suppression schemes, while base stations with greater overhead communication capacities may select the beam avoidance scheme. Additionally or alternatively, the serving base station 105-a or network device may dynamically select a scheme from a set of supported schemes based on one or more communication parameters. These communication parameters may be associated with a target UE 115 (e.g., UE 115-a), the serving base station 105-a, or both. If a network device selects a scheme, the device may transmit an indication of the scheme to serving base station 105-a. Serving base station 105-a may generate the OTA interference coordination message based on the selected scheme.

By transmitting the OTA interference coordination message to base station 105-b, base station 105-a may enable the base stations 105 to communicate with UEs 115 with minimal interference. If serving base station 105-a is transmitting information to UE 115-a in a first TTI, the OTA interference coordination message may indicate to neighboring base station 105-b to modify signaling to UE 115-d in the first TTI. As a result, UE 115-a may successfully receive the information with minimal interference handling due to base station 105-b.

Figure 3A:
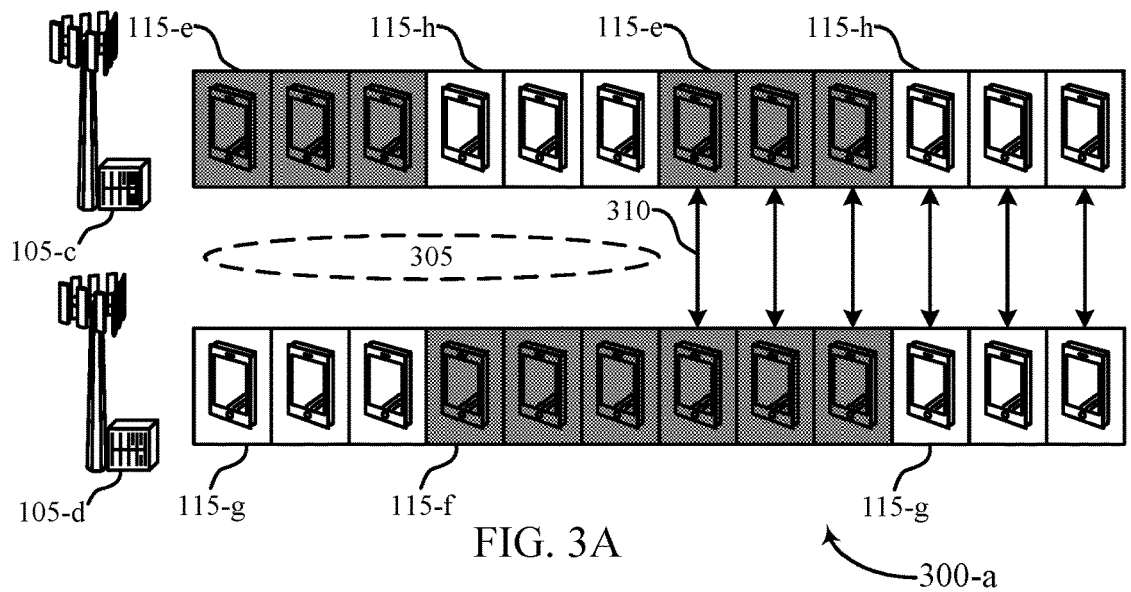
FIGS. 3A, 3B, and 3C illustrate examples of scheduling decisions that support OTA interference coordination among base stations in accordance with one or more aspects of the present disclosure.

FIG. 3A illustrates an example of scheduling decisions 300-a that support OTA interference coordination among base stations in accordance with one or more aspects of the present disclosure. In some examples, base stations 105-c and 105-d may perform scheduling decisions 300-a. Base station 105-c may be an example of a serving base station 105-c, such as base station 105-a as described with reference to FIG. 2, and base station 105-d may be an example of a neighboring base station 105-d, such as base station 105-b as described with reference to FIG. 2. Serving base station 105-c may communicate over various beams with UE 115-e and UE 115-h, while neighboring base station 105-d may communicate over various beams with UE 115-f and UE 115-g.

In some implementations, base station 105-c may communicate with UE 115-e, and UE 115-e may experience minimal or no interference 305 from base station 105-d when base station 105-d communicates with UE 115-g (e.g., based on the locations of UE 115-e and UE 115-g in the cells). Similarly, base station 105-c may communicate with UE 115-h, and UE 115-h may experience minimal or no interference 305 from base station 105-d when base station 105-d communicates with UE 115-f. However, base station 105-c may communicate with UE 115-e, and UE 115-e may experience interference 310 (e.g., significant interference above some interference threshold) when base station 105-d is in communication with UE 115-f. Similarly, base station 105-c may communicate with UE 115-h, and UE 115-h may experience interference 310 when base station 105-d is in communication with UE 115-g.

In some examples, base stations 105-c and 105-d may coordinate scheduling using OTA coordination signaling. Base station 105-c may transmit interference coordination information, including beam fixation information, to base station 105-d. The coordination information may include whether base station 105-d should implement beam fixation and the start and end times of the interference beam fixation. Upon receiving the beam fixation coordination information, base station 105-d may fix a transmit beam for a configured duration of time (e.g., whether or not the active beam results in interference). During the fixed beam interference duration, base station 105-d may refrain from changing beams to ensure the interference is stabilized for the time duration. Base station 105-c may follow a similar or identical fixation schedule. Beam fixation may stabilize the interference experienced by UEs 115 within each fixed time interval, so UEs 115 may avoid experiencing highly variable interference due to base stations 105 switching transmit beams frequently and/or at aperiodic intervals. Instead, for a time duration, a UE 115 (e.g., UE 115-e) may experience the same level of interference (or a relatively constant level of interference within a threshold variance). Although this stable interference may be a high level of interference or a low level of interference, the stabilized interference allows UE 115-e and base station 105-c to better account for the interference. For example, base station 105-c may reduce a coding rate for the durations of high interference to support more reliable signaling and may increase the coding rate for the low interference durations to support increased throughput.

Base station 105-d may have complete resource utilization, as base station 105-d is able to communicate in each TTI during the fixed beam interference duration. Signaling overhead related to transmitting the OTA interference coordination message with parameters for beam fixation may be relatively low due to the smaller amount of information serving base station 105-c transmits for beam fixation, as serving base station 105-c may refrain from including beam index information in the message. In some examples, base station 105-d may transmit to UE 115-g with a beam for a fixed duration of time while base station 105-c transmits to UE 115-e to ensure that no interference 305 occurs. During a subsequent fixed duration of time, base station 105-d may communicate with UE 115-f while base station 105-c communicates with UE 115-e, causing interference 310. The periodicity of beam switches in the beam fixation scheme may be based on one or more parameters indicated in the OTA interference coordination message.

Figure 3B:
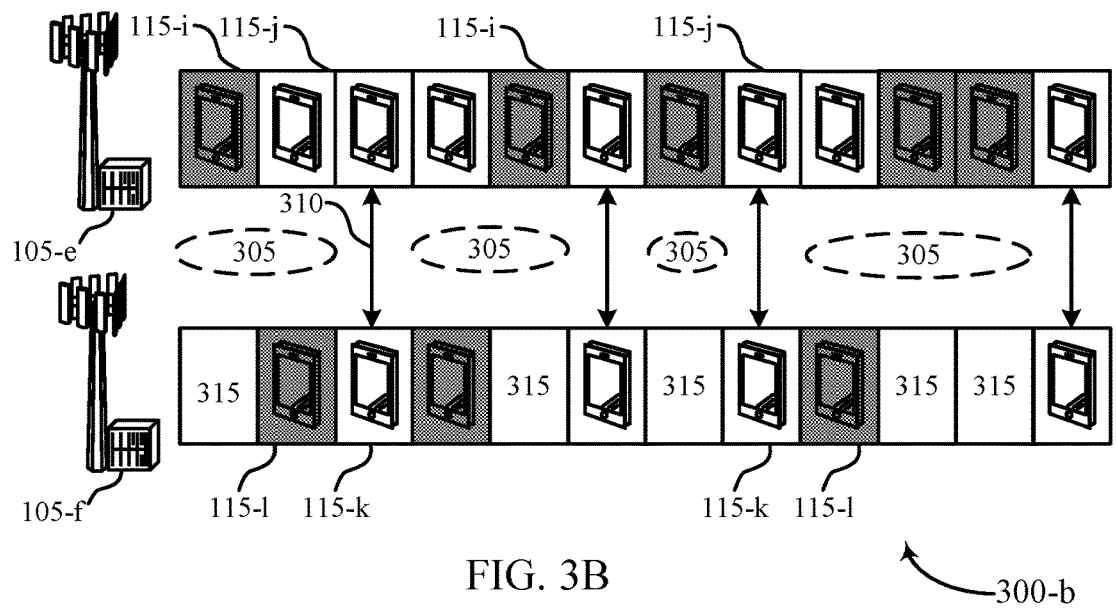

FIG. 3B illustrates an example of scheduling decisions 300-b that support OTA interference coordination among base stations in accordance with one or more aspects of the present disclosure. In some examples, base stations 105-e and 105-f may perform scheduling decisions 300-b. Base station 105-e may be an example of a serving base station 105-e, such as base station 105-a as described with reference to FIG. 2, and base station 105-f may be an example of a neighboring base station 105-f, such as base station 105-b as described with reference to FIG. 2. Serving base station 105-e may communicate over various beams with UE 115-i and UE 115-j, while neighboring base station 105-f may communicate over various beams with UE 115-l and UE 115-k.

In some implementations, base station 105-e may communicate with UE 115-j, and UE 115-j may avoid experiencing significant interference from base station 105-f when base station 105-f communicates with UE 115-1. However, base station 105-e may communicate with UE 115-j, and UE 115-j may experience significant interference 310 when base station 105-f communicates with UE 115-k. In some examples, base stations 105-e and 105-f may coordinate interference using OTA interference coordination signaling. Base station 105-e may transmit interference coordination information including interference beam blanking information to base station 105-*f* The interference beam blanking information may include whether base station 105-*f* should implement the interfering beam blank and the start and end times of the scheduling coordination. Upon receiving the interference beam blanking information, base station 105-*f* may blank an interfering beam for one or more TTIs or for a particular duration of time. "Blanking" a beam may refer to refraining from transmitting on the beam during a TTI. In some cases, base station 105-*f* may refrain from transmitting on any communication beam in specific TTIs (e.g., TTIs in which base station 105-*e* transmits to UE 115-*i*).

In some examples, for the TTIs in which base station 105-*e* schedules communications with UE 115-*i*, base station 105-*f* may refrain from scheduling any UEs 115 for communication. When base station 105-*f* refrains from assigning any UEs 115, UE 115-*i* may experience no interference 305 from base station 105-*f* due to the blank UE assignment 315. Base stations 105-*e* and 105-*f* may coordinate scheduling by implementing transmission blanking and may experience a gain in interference mitigation. Signaling overhead for the OTA interference coordination message may be relatively low due to the relatively small amount of information serving base station 105-*e* transmits for beam blanking, as serving base station 105-*e* may refrain from including beam index information in the message. The OTA interference coordination message may indicate the TTIs for the interfering base station(s) 105 to blank transmissions or perform backoff procedures.

Figure 3C:
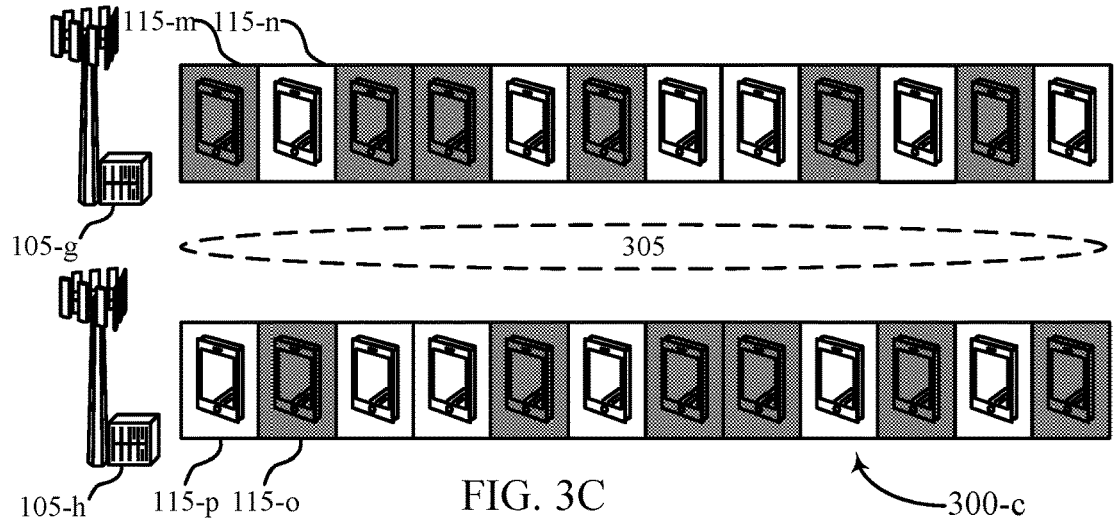

FIG. 3C illustrates an example of scheduling decisions 300-*c* that support OTA interference coordination in accordance with one or more aspects of the present disclosure. In some examples, base stations 105-*g* and 105-*h* may perform scheduling decisions 300-*c*. Base station 105-*g* may be an example of a serving base station 105-*g*, such as base station 105-*a* as described with reference to FIG. 2, and base station 105-*h* may be an example of a neighboring base station 105-*h*, such as base station 105-*b* as described with reference to FIG. 2. Serving base station 105-*g* may communicate over various beams with UE 115-*m* and UE 115-*n*, while neighboring base station 105-*h* may communicate over various beams with UE 115-*o* and UE 115-*p*.

In some implementations, base station 105-*g* may communicate with UE 115-*m*, and UE 115-*m* may experience minimal or no interference 305 from base station 105-*h* when base station 105-*h* communicates with UE 115-*p*. Similarly, base station 105-*g* may communicate with UE 115-*n*, and UE 115-*n* may experience minimal or no interference 305 from base station 105-*h* when base station 105-*h* communicates with UE 115-*o*.

In some examples, base stations 105-*g* and 105-*h* may coordinate scheduling using OTA interference coordination signaling. Base station 105-*g* may transmit interference coordination information, including beam avoidance information, to base station 105-*h*. The interference coordination information may include whether base station 105-*h* should implement beam avoidance, the start and end times of the interference beam avoidance, the one or more interfering beam indexes to avoid, or some combination of this information. Upon receiving the interfering beam avoidance coordination information, base station 105-*h* may modify scheduling decisions for UEs 115 to reduce interference to the UEs 115 scheduled by base station 105-*g*. In some cases, to avoid or mitigate interference, base station 105-*h* may schedule communications with UE 115-*p* in TTIs that base station 105-*g* schedules communications with UE 115-*m*. In some other cases, to avoid or mitigate interference, base station 105-*h* may assign UE 115-*o* to time resources used by base station 105-*g* for communications with UE 115-*n*. Base station 105-*h* may have complete resource utilization, as base station 105-*h* is able to communicate in each TTI while implementing the beam avoidance scheme.

Figure 4:
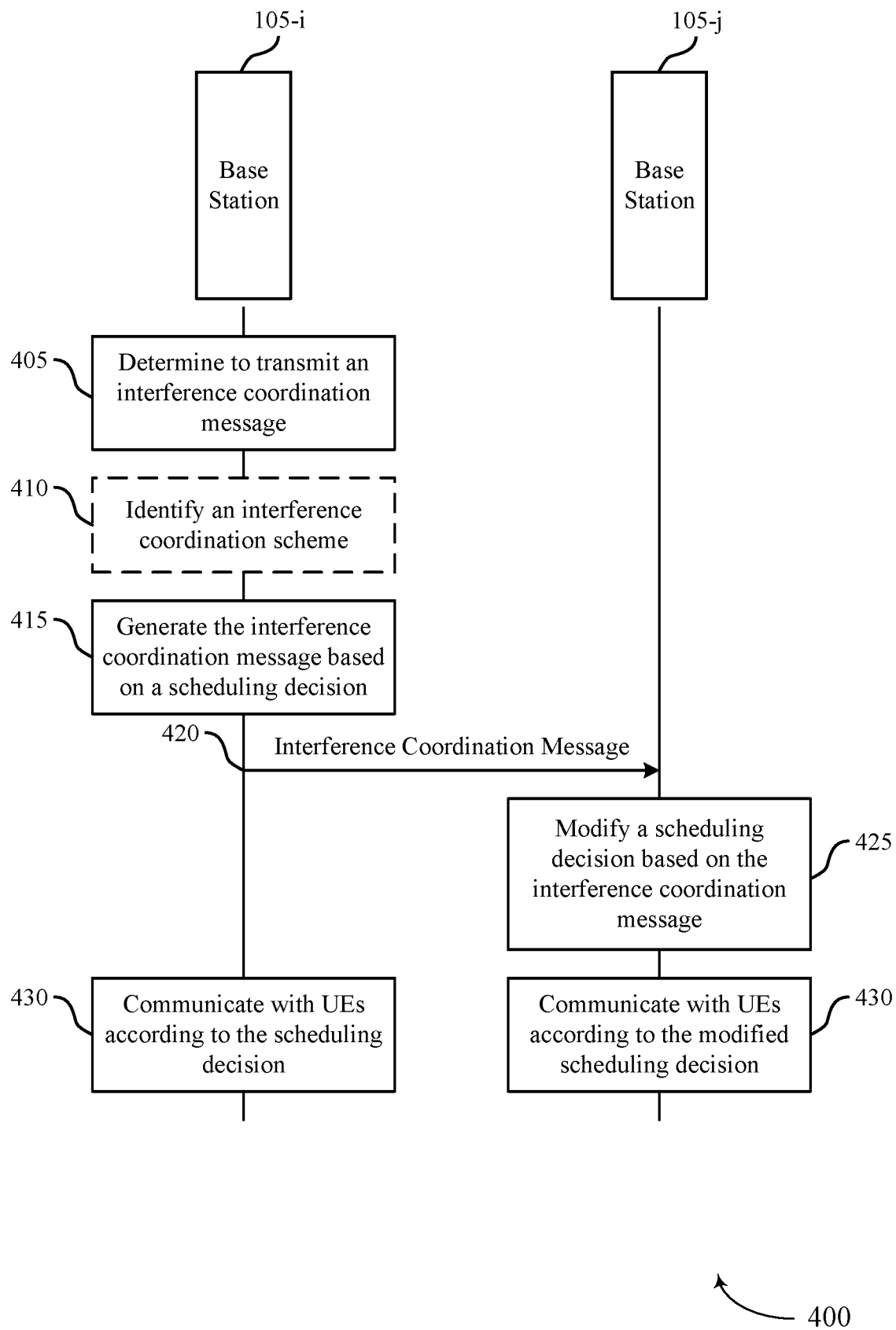
FIG. 4 illustrates an example of a process flow that supports OTA interference coordination among base stations in accordance with one or more aspects of the present disclosure.

FIG. 4 illustrates an example of a process flow 400 that supports OTA interference coordination among base stations in accordance with one or more aspects of the present disclosure. The process flow 400 illustrates an example OTA interference coordination signaling procedure to mitigate and/or stabilize interference in a wireless communications system. For example, base station 105-*i* may be an example of a serving base station 105 for a first UE 115, and base station 105-*j* may be an example of a neighboring base station 105 that may potentially cause interference to the first UE 115. Base stations 105-*i* and 105-*j* may be examples of the corresponding devices described with reference to FIGS. 1 through 3. Alternative examples of the following may be implemented, where some operations are performed in a different order than described or are not performed at all. In some cases, operations may include additional features not mentioned below, or further operations may be added.

At 405, base station 105-*i* may determine to transmit an interference coordination message (e.g., in OTA interference coordination signaling). Base station 105-*i* may determine to transmit the message based on a communication parameter of a UE 115 served by base station 105-*i*.

At 410, base station 105-*i* may identify an interference coordination scheme for scheduling coordination. In a first example, base station 105-*i* is configured with an interference coordination scheme to implement. In a second example, base station 105-*i* dynamically selects an interference coordination scheme from a set of possible interference coordination schemes based on one or more communication parameters. In a third example, a network device dynamically selects the interference coordination scheme and transmits an indication of the interference coordination scheme to base station 105-*i*. Base station 105-*i* may identify the interference coordination scheme in a short-term or long-term manner. For example, for short-term operations, base station 105-*i* may identify an interference coordination scheme for each TTI or interference coordination message separately. For long-term operations, base station 105-*i* may identify an interference coordination scheme and may implement the scheme each time base station 105-*i* determines to transmit an interference coordination message (e.g., at 405).

At 415, base station 105-*i* may generate the interference coordination message based on determining to transmit the message and based on a scheduling decision for base station 105-*i*. For example, this scheduling decision may indicate TTIs in which base station 105-*i* schedules communications with the UE 115. Base station 105-*i* may indicate these TTIs in the payload of the generated message (e.g., so that a neighboring base station 105 receiving the message may identify TTIs in which to coordinate scheduling for reduced and/or stabilized interference at the UE 115).

At 420, base station 105-*i* may transmit the generated interference coordination message to base station 105-*j*. In some cases, base station 105-*i* may transmit the message directly to base station 105-*j*. In some other cases, base station 105-*i* may transmit the message to base station 105-*j* via a UE 115 (e.g., the UE 115 served by base station 105-*i*). Base station 105-*j* may receive the interference coordination message and, at 425, may modify a scheduling decision based on the interference coordination message (e.g., based on the interference coordination scheme). For example, in the TTIs in which base station 105-*i* has scheduled communications with the UE 115, base station 105-*j* may schedule communications with UEs 115 beyond a threshold distance from the UE 115 (e.g., to meet a maximum interference threshold) or reduce the transmit power for beams directed near the UE 115 (e.g., beams that may potentially cause interference to the UE 115). At 430, base stations 105-*i* and 105-*j* may communicate with UEs 115 according to the scheduling decisions. For example, base station 105-*i* may communicate using an unmodified scheduling decision, while base station 105-*j* may communicate using a modified scheduling decision based on the OTA interference coordination message.

Figure 5:
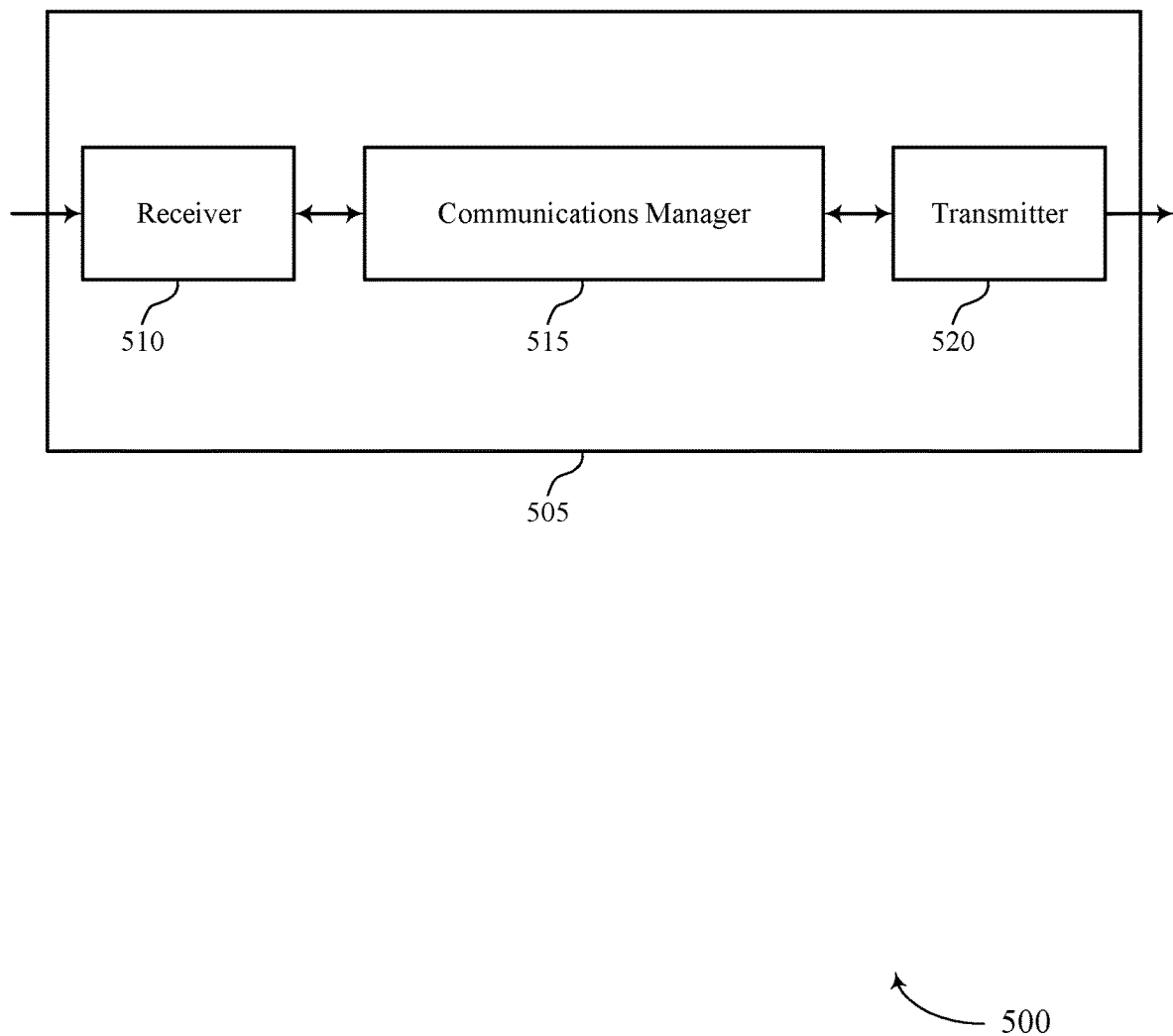
FIGS. 5 and 6 show block diagrams of devices that support OTA interference coordination among base stations in accordance with one or more aspects of the present disclosure.

FIG. 5 shows a block diagram 500 of a device 505 that supports OTA interference coordination among base stations in accordance with one or more aspects of the present disclosure. The device 505 may be an example of aspects of a base station 105 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to OTA interference coordination, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may be a component of a first base station. The communications manager 515 may determine to transmit an interference coordination message based on a communication parameter of a UE served by the first base station, dynamically select an interference coordination scheme for at least a second base station based on the communication parameter, generate the interference coordination message based on the interference coordination scheme and a scheduling decision for the first base station, and transmit the generated interference coordination message to at least the second base station. Additionally or alternatively, the communications manager 515 may receive an interference coordination message from a second base station, determine a dynamically selected interference coordination scheme based on the interference coordination message, modify a scheduling decision based on the dynamically selected interference coordination scheme, and communicate with one or more UEs according to the modified scheduling decision.

The actions performed by the communications manager 515 as described herein may be implemented to realize one or more potential advantages. One implementation may support a base station 105 (e.g., the first base station) improving the reliability of transmissions to the served UE based on mitigating interference from a neighboring base station (e.g., the second base station). For example, transmitting the interference coordination message may instruct the second base station to suppress or avoid transmitting interfering signals, improving the transmission reliability of the first base station to the UE. Another implementation may support the base station 105 improving rate control for managing interference based on stabilizing the interference over one or more fixed periods. For example, transmitting the interference coordination message may instruct the second base station to fix an active communication beam for a configured time duration, allowing the first base station to improve interference estimation for the configured time duration and update transmission parameters accordingly (e.g., modify coding rate, implement positive acknowledgment/negative acknowledgment (ACK/NACK) feedback, etc.).

Based on transmitting the interference coordination message to an interfering base station, a processor of the first base station 105 (e.g., controlling the receiver 510, the communications manager 515, and/or the transmitter 520) may reduce processing resources used for downlink transmissions. For example, transmitting the interference coordination message may improve transmission reliability to a target UE. As such, the base station 105 may reduce the number of retransmissions used to successfully transmit the message on the downlink to the target UE. Reducing the number of retransmissions may reduce a number of times the processor ramps up processing power and turns on processing units to handle downlink message encoding and/or transmission. This reduced number of retransmissions may also reduce overhead on the downlink channel (e.g., in addition to reducing the processing overhead at the processor).

The communications manager 515 may be an example of aspects of the communications manager 810 described herein. The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
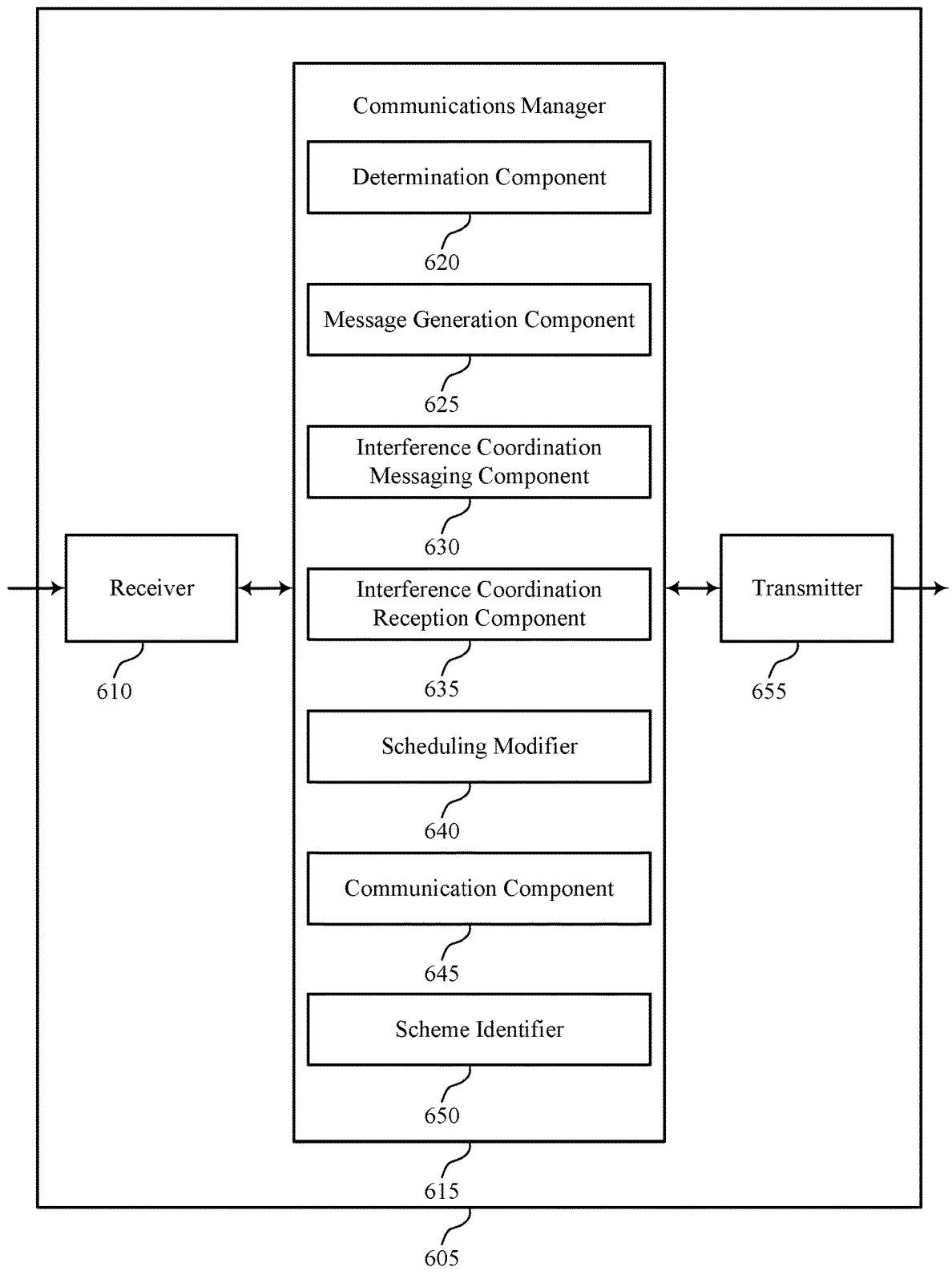

FIG. 6 shows a block diagram 600 of a device 605 that supports OTA interference coordination among base stations in accordance with one or more aspects of the present disclosure. The device 605 may be an example of aspects of a device 505, or a base station 105 as described herein. The device 605 may include a receiver 610, a communications manager 615, and a transmitter 655. The device 605 may also include a processor. Each of these components may be in communication with one another (e.g., via one or more buses).

The receiver 610 may receive information such as packets, user data, or control information associated with various information channels (e.g., control channels, data channels, and information related to OTA interference coordination, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a determination component 620, a message generation component 625, an interference coordination messaging component 630, an interference coordination reception component 635, a scheduling modifier 640, a communication component 645, a scheme identifier 650, or any combination of these components. The communications manager 615 may be an example of aspects of the communications manager 810 described herein. The communications manager 615 may be implemented at a first base station.

In some implementations, the determination component 620 may determine to transmit an interference coordination message based on a communication parameter of a UE served by the first base station. The scheme identifier 650 may dynamically select an interference coordination scheme for at least a second base station based on the communication parameter. The message generation component 625 may generate the interference coordination message based on the interference coordination scheme and a scheduling decision for the first base station. The interference coordination messaging component 630 may transmit the generated interference coordination message to at least the second base station.

In other implementations, the interference coordination reception component 635 may receive an interference coordination message from a second base station. The scheme identifier 650 may determine a dynamically selected interference coordination scheme based on the interference coordination message. The scheduling modifier 640 may modify a scheduling decision based on the dynamically selected interference coordination scheme. The communication component 645 may communicate with one or more UEs according to the modified scheduling decision.

The transmitter 655 may transmit signals generated by other components of the device 605. In some examples, the transmitter 655 may be collocated with a receiver 610 in a transceiver module. For example, the transmitter 655 may be an example of aspects of the transceiver 820 described with reference to FIG. 8. The transmitter 655 may utilize a single antenna or a set of antennas.

Figure 7:
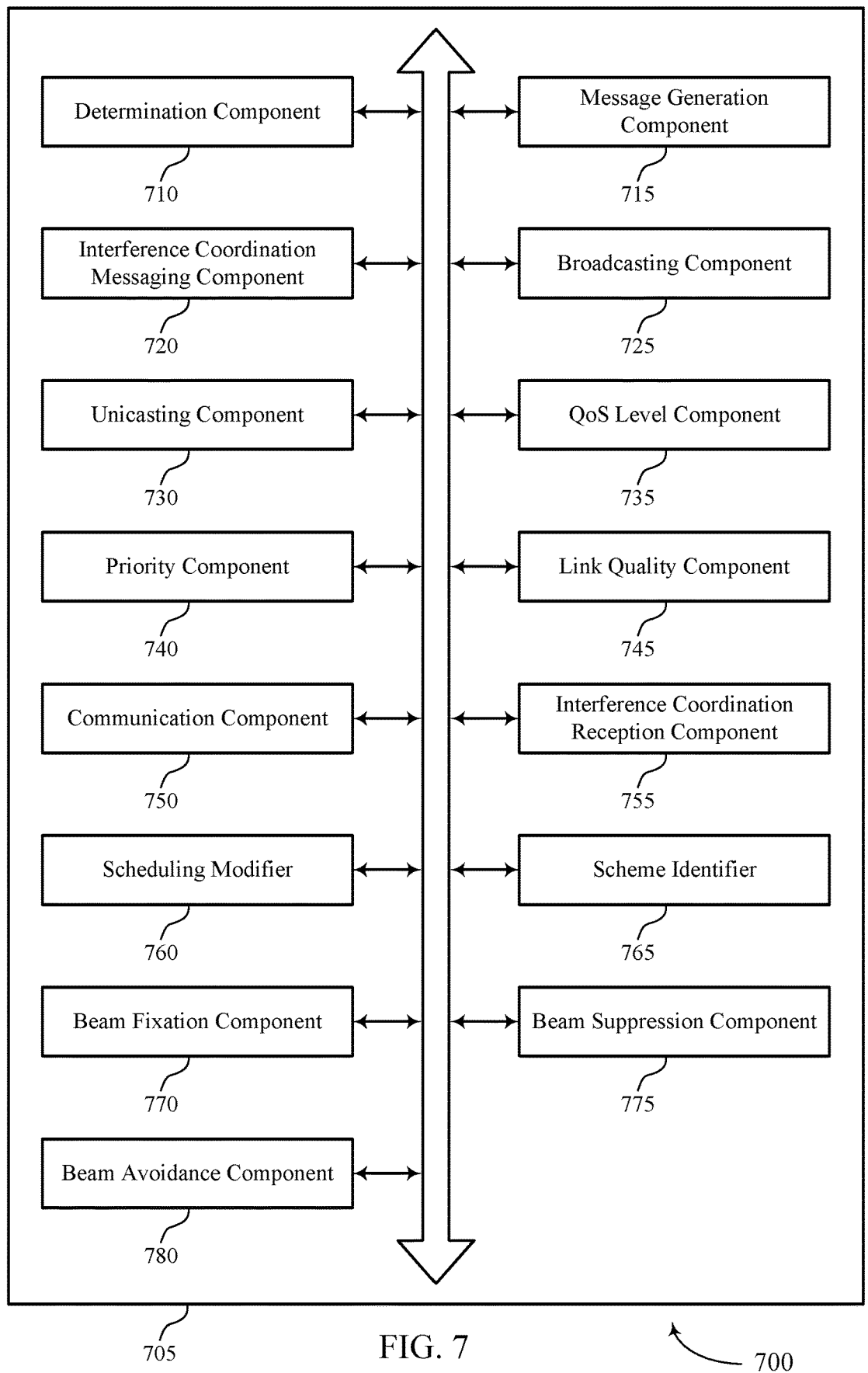
FIG. 7 shows a block diagram of a communications manager that supports OTA interference coordination among base stations in accordance with one or more aspects of the present disclosure.

FIG. 7 shows a block diagram 700 of a communications manager 705 that supports OTA interference coordination among base stations in accordance with one or more aspects of the present disclosure. The communications manager 705 may be an example of aspects of a communications manager 515, a communications manager 615, or a communications manager 810 described herein. The communications manager 705 may include a determination component 710, a message generation component 715, an interference coordination messaging component 720, a broadcasting component 725, a unicasting component 730, a QoS level component 735, a priority component 740, a link quality component 745, a communication component 750, an interference coordination reception component 755, a scheduling modifier 760, a scheme identifier 765, a beam fixation component 770, a beam suppression component 775, a beam avoidance component 780, or any combination of these components. Each of these modules may communicate, directly or indirectly, with one another (e.g., via one or more buses). The communications manager 705 may be a component of a first base station.

In one implementation, the determination component 710 may determine to transmit an interference coordination message based on a communication parameter of a UE served by the first base station. The message generation component 715 may generate the interference coordination message based on the determining and a scheduling decision for the first base station. In some examples, generating the interference coordination message may involve the message generation component 715 generating a payload of the interference coordination message based on the scheduling decision for the first base station, where the payload includes an indication of a scheme for interference coordination, or a trigger for interference coordination, or a start time for interference coordination, or an end time for interference coordination, or a time duration for interference coordination, or a beam fixation time period for at least the second base station, or a frequency resource for transmission by the first base station, or a transmit power level for at least the second base station, or a transmit power reduction level for at least the second base station, or a UE priority value for the UE, or a data traffic priority value for the UE, or a cell ID for the first base station or the second base station, or a base station ID for the first base station or the second base station, or a TRP ID for the first base station or the second base station, or one or more beam indexes, or a combination thereof.

The interference coordination messaging component 720 may transmit the generated interference coordination message to at least a second base station. In some examples, transmitting the interference coordination message may involve the interference coordination messaging component 720 transmitting the generated interference coordination message via a wireless backhaul link, or an uplink channel, or a downlink channel, or a combination thereof. In some cases, the generated interference coordination message is transmitted based on a duplex capability of the first base station or a duplex capability of the second base station or both.

In some cases, transmitting the interference coordination message may involve the broadcasting component 725 broadcasting the generated interference coordination message to any base stations (e.g., a set of base stations within a receiving range of the first base station), the set of base stations including at least the second base station. In some other cases, transmitting the interference coordination message may involve the unicasting component 730 unicasting the generated interference coordination message to a designated base station group including at least the second base station.

In some examples, the communication parameter may be an example of a QoS level for a downlink transmission to the UE. In these examples, the QoS level component 735 may identify that the QoS level for the downlink transmission to the UE is greater than a threshold QoS level, where determining to transmit the interference coordination message is based on the identifying.

In some examples, the communication parameter may be an example of a priority value for the UE. In these examples, the priority component 740 may identify that the priority value for the UE is greater than a threshold priority value, where the determining to transmit the interference coordination message is based on the identifying.

In some examples, the communication parameter may be an example of an SIR value a SINR value or both for the UE. In these examples, the link quality component 745 may identify that the SIR or the SINR or both for the UE are less than one or more threshold values, where the determining to transmit the interference coordination message is based on the identifying.

In some examples, the communication parameter may be an example of location information for the UE. In these examples, the link quality component 745 may identify that the UE is greater than a threshold distance away from the first base station based on the location information, where the determining to transmit the interference coordination message is based on the identifying.

In some cases, the communication component 750 may communicate with the UE according to the scheduling decision.

In another implementation, the interference coordination reception component 755 may receive an interference coordination message from a second base station. In some examples, the interference coordination reception component 755 may receive the interference coordination message via a wireless backhaul link, or an uplink channel, or a downlink channel, or a combination thereof. The scheduling modifier 760 may modify a scheduling decision based on the interference coordination message. The communication component 750 may communicate with one or more UEs according to the modified scheduling decision.

The scheme identifier 765 may determine an interference coordination scheme based on the interference coordination message, where the scheduling decision is modified based on the interference coordination scheme. For example, the scheme identifier 765 may determine a dynamically selected interference coordination scheme based on the interference coordination message. In some examples, the scheme identifier 765 may dynamically select an interference coordination scheme for at least a second base station based at least in part on the communication parameter.

In a first example, the interference coordination scheme may be an interfering beam fixation scheme. Modifying the scheduling decision may involve the beam fixation component 770 operating using each communication beam of a set of communication beams for a configured number of TTIs based on a beam fixation time interval or a beam fixation periodicity or both indicated by the interference coordination message. In some cases, the set of communication beams is a subset of the set of communication beams operated by the first base station.

In a second example, the interference coordination scheme may be an interfering beam suppression scheme. Modifying the scheduling decision may involve the beam suppression component 775 modifying a transmit power for a set of communication beams based on a second scheduling decision for the second base station. In some examples, the beam suppression component 775 may reduce the transmit power to zero, or to a transmit power level indicated by the interference coordination message, or by a transmit power reduction level indicated by the interference coordination message for the set of communication beams based on the interference coordination scheme. In some examples, the beam suppression component 775 may determine one or more TTIs in which the second base station is scheduled to transmit to a specific UE according to the second scheduling decision, where the transmit power for the set of communication beams is modified for the one or more TTIs. In some cases, the set of communication beams is a subset of the set of communication beams operated by the first base station.

In a third example, the interference coordination scheme may be an interfering beam avoidance scheme. Modifying the scheduling decision may involve the beam avoidance component 780 refraining from operating using a set of communication beams based on a second scheduling decision for the second base station. In some examples, the beam avoidance component 780 may determine the set of communication beams based on a cell ID for the second base station, or a base station ID for the second base station, or a TRP ID for the second base station, or one or more beam indexes, or a combination thereof indicated by the interference coordination message. In some examples, refraining from operating using the set of communication beams may involve the beam avoidance component 780 determining one or more TTIs in which the second base station is scheduled to transmit to a specific UE according to the second scheduling decision and operating using a second set of communication beams distinct from the set of communication beams for the one or more TTIs. In some cases, the set of communication beams is a subset of the set of communication beams operated by the first base station.

Figure 8:
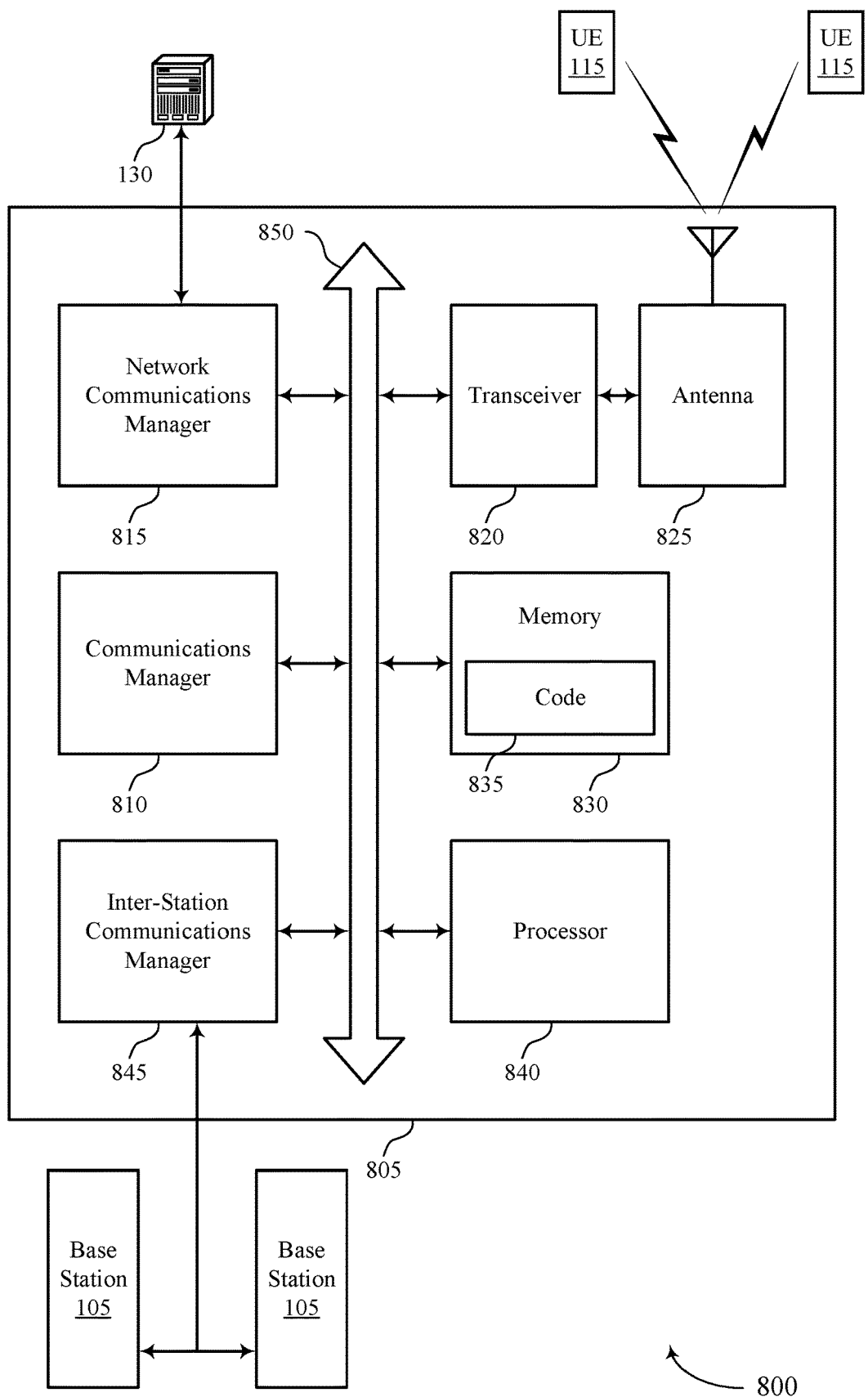
FIG. 8 shows a diagram of a system including a device that supports OTA interference coordination among base stations in accordance with one or more aspects of the present disclosure.

FIG. 8 shows a diagram of a system 800 including a device 805 that supports OTA interference coordination among base stations in accordance with one or more aspects of the present disclosure. The device 805 may be an example of or include the components of device 505, device 605, or a base station 105 as described herein. The device 805 may include components for bi-directional voice and data communications including components for transmitting and receiving communications, including a communications manager 810, a network communications manager 815, a transceiver 820, an antenna 825, memory 830, a processor 840, and an inter-station communications manager 845. These components may be in electronic communication via one or more buses (e.g., bus 850).

The communications manager 810 may be implemented at a first base station. The communications manager 810 may determine to transmit an interference coordination message based on a communication parameter of a UE served by the first base station, dynamically select an interference coordination scheme for at least a second base station based on the communication parameter, generate the interference coordination message based on the interference coordination scheme and a scheduling decision for the first base station, and transmit the generated interference coordination message to at least the second base station. Additionally or alternatively, the communications manager 810 may receive an interference coordination message from a second base station, determine a dynamically selected interference coordination scheme based on the interference coordination message, modify a scheduling decision based on the dynamically selected interference coordination message, and communicate with one or more UEs according to the modified scheduling decision.

The network communications manager 815 may manage communications with the core network 130 (e.g., via one or more wired backhaul links). For example, the network communications manager 815 may manage the transfer of data communications for client devices, such as one or more UEs 115.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM), read-only memory (ROM), or a combination thereof. The memory 830 may store computer-readable code 835 including instructions that, when executed by a processor (e.g., the processor 840) cause the device to perform various functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 840 may be configured to operate a memory array using a memory controller. In some cases, a memory controller may be integrated into processor 840. The processor 840 may be configured to execute computer-readable instructions stored in a memory (e.g., the memory 830) to cause the device 805 to perform various functions (e.g., functions or tasks supporting OTA interference coordination among base stations).

The inter-station communications manager 845 may manage communications with other base station 105 and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communication network technology to provide communication between base stations 105.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
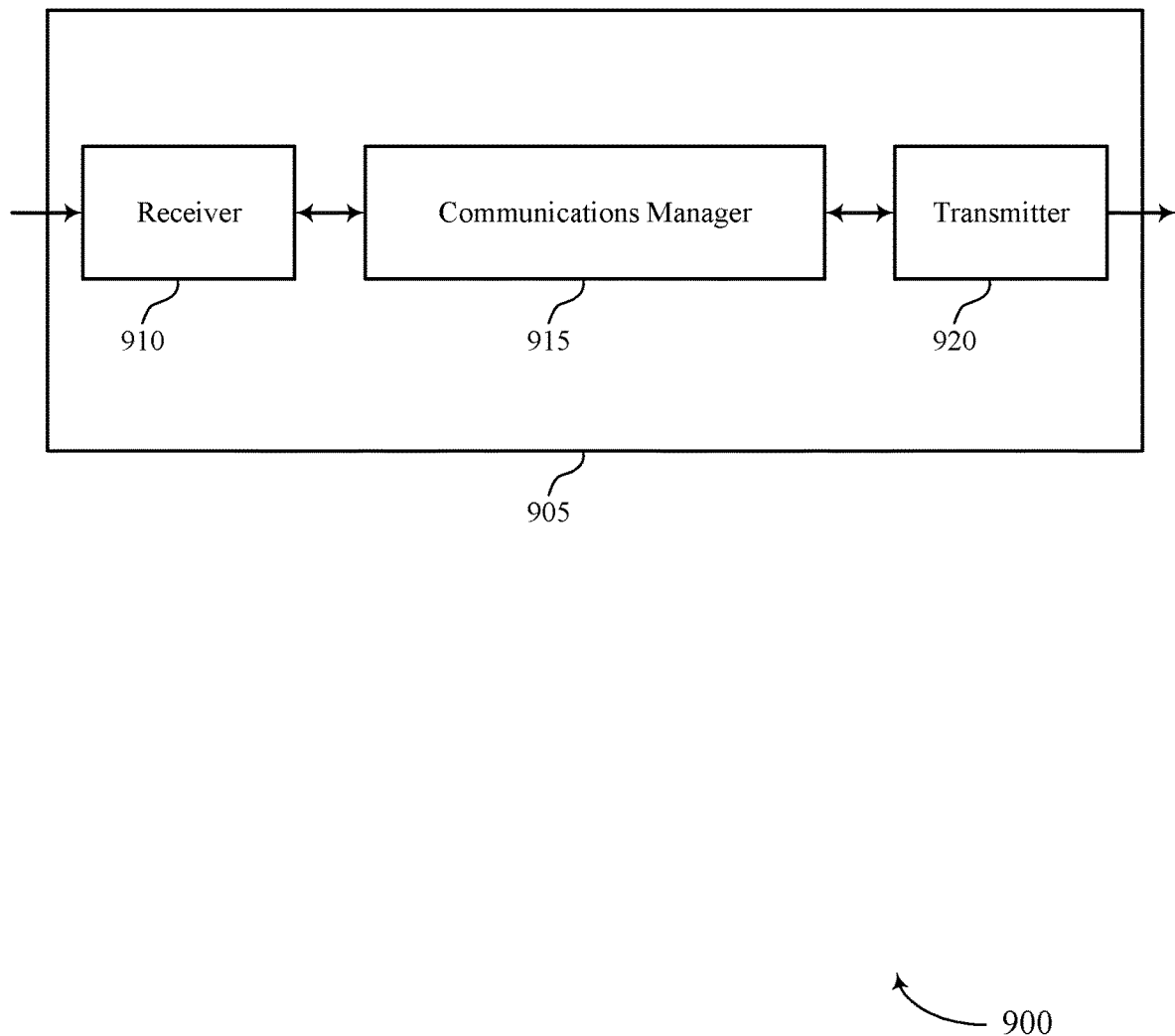
FIGS. 9 and 10 show block diagrams of devices that support OTA interference coordination among base stations in accordance with one or more aspects of the present disclosure.

FIG. 9 shows a block diagram 900 of a device 905 that supports OTA interference coordination among base stations in accordance with one or more aspects of the present disclosure. The device 905 may be an example of aspects of a network entity as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to interference coordination, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may be implemented at a device in a wireless network, such as a base station 105 or another network device. The communications manager 915 may determine a communication parameter of a UE served by a serving base station or of the serving base station or of both, dynamically select an interference coordination scheme for the serving base station and one or more neighboring base stations based on the communication parameter, and transmit an indication of the dynamically selected interference coordination scheme to a base station. The communications manager 915 may be an example of aspects of the communications manager 1210 described herein.

The actions performed by the communications manager 915 as described herein may be implemented to realize one or more potential advantages. One implementation may allow the network entity (e.g., a base station 105, a network device, etc.) to dynamically select an interference coordination scheme for base stations based on current conditions in the network. For example, based on a level of interference or a UE prioritization policy, the network entity may determine between a beam fixation scheme, a beam suppression scheme, and/or a beam avoidance scheme. The beam fixation scheme may support interference stabilization in the network and may incur a low signaling overhead for inter-ference coordination. The beam suppression scheme and the beam avoidance scheme may support interference mitigation for a target UE in the network, improving transmission reliability to the target UE.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
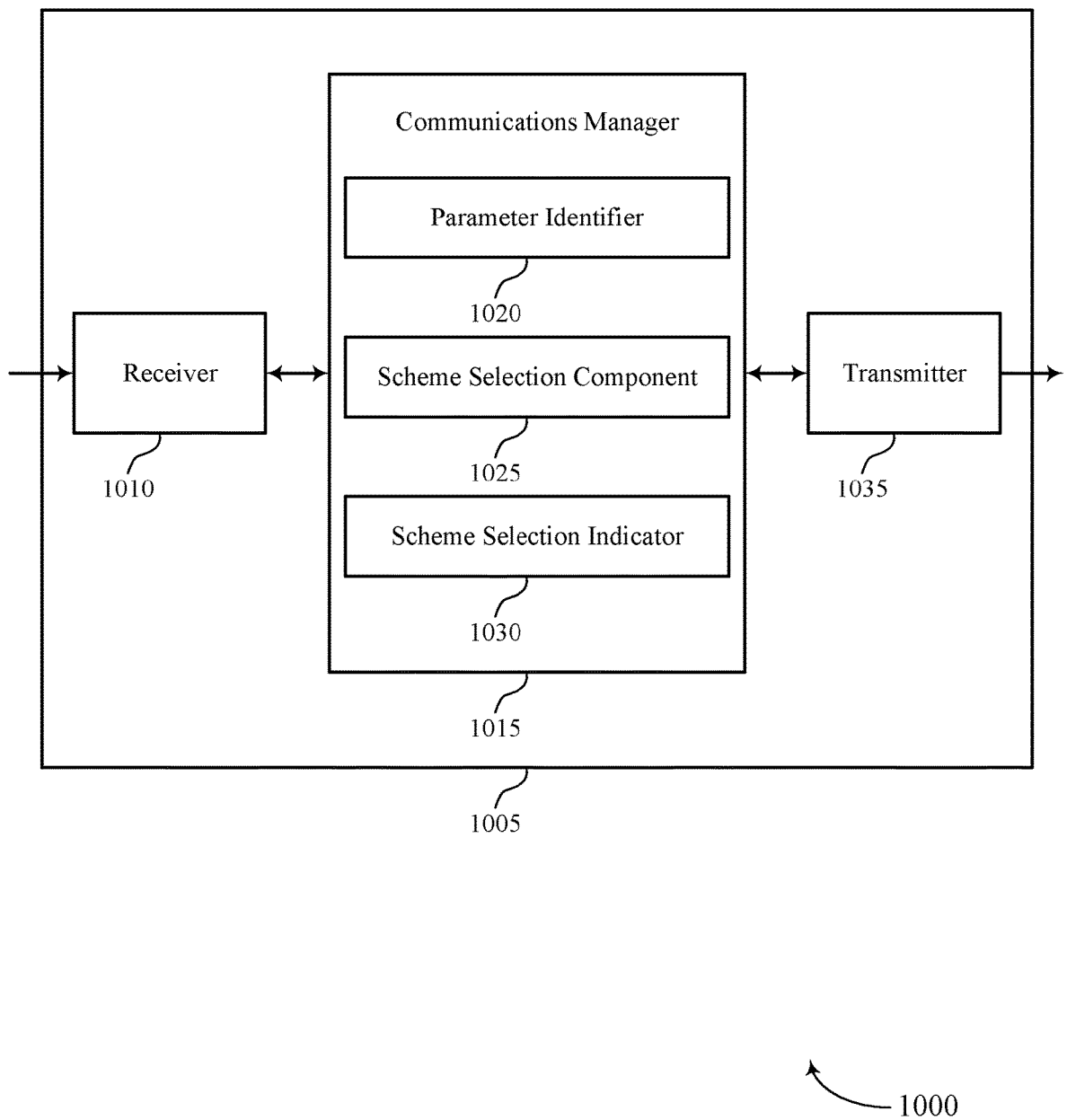

FIG. 10 shows a block diagram 1000 of a device 1005 that supports OTA interference coordination among base stations in accordance with one or more aspects of the present disclosure. The device 1005 may be an example of aspects of a device 905 or a network entity as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to OTA interference coordination, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a parameter identifier 1020, a scheme selection component 1025, and a scheme selection indicator 1030. The communications manager 1015 may be an example of aspects of the communications manager 1210 described herein.

The parameter identifier 1020 may determine a communication parameter. The communication parameter may be for a UE served by a serving base station or for the serving base station or for both. The scheme selection component 1025 may dynamically select an interference coordination scheme for the serving base station and one or more neighboring base stations based on the communication parameter. The scheme selection indicator 1030 may transmit an indication of the dynamically selected interference coordination scheme to a base station (e.g., the serving base station or the one or more neighboring base stations).

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
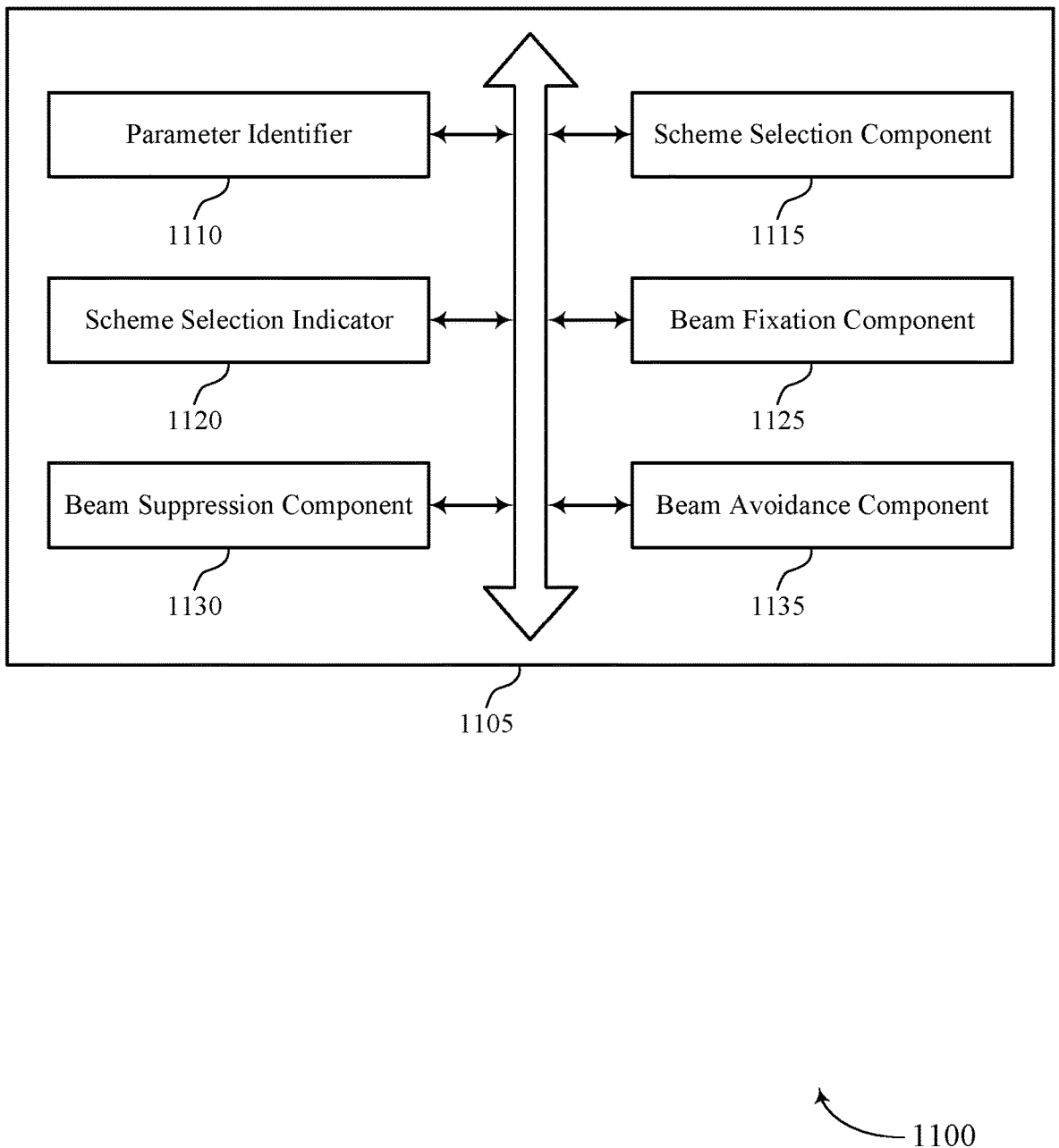
FIG. 11 shows a block diagram of a communications manager that supports OTA interference coordination among base stations in accordance with one or more aspects of the present disclosure.

FIG. 11 shows a block diagram 1100 of a communications manager 1105 that supports OTA interference coordination among base stations in accordance with one or more aspects of the present disclosure. The communications manager 1105 may be an example of aspects of a communications manager 915, a communications manager 1015, or a communications manager 1210 described herein. The communications manager 1105 may include a parameter identifier 1110, a scheme selection component 1115, a scheme selection indicator 1120, a beam fixation component 1125, a beam suppression component 1130, a beam avoidance component 1135, or some combination of these components. Each of these modules may communicate, directly or indirectly, with one another (e.g., via one or more buses). The communications manager 1105 may be implemented at a device in a wireless network, such as a base station 105 or another network device.

The parameter identifier 1110 may determine a communication parameter of a UE served by a serving base station or of the serving base station or of both. In some cases, the communication parameter includes a QoS level for a downlink transmission from the serving base station to the UE, or a priority value for the UE, or an SIR for the UE, or an SINR for the UE, or location information for the UE relative to the serving base station, or a combination thereof.

The scheme selection component 1115 may dynamically select an interference coordination scheme for the serving base station and one or more neighboring base stations based on the communication parameter. The scheme selection indicator 1120 may transmit an indication of the dynamically selected interference coordination scheme to a base station. In some examples, transmitting the indication of the dynamically selected interference coordination scheme may involve the scheme selection indicator 1120 transmitting an indication of whether to implement the dynamically selected interference coordination scheme, or a start time for implementing the dynamically selected interference coordination scheme, or an end time for implementing the dynamically selected interference coordination scheme, or a combination thereof.

In some examples, the device in the wireless network may be a network entity and the indication of the selected scheme may be transmitted to the serving base station. In these examples, determining the communication parameter may involve the parameter identifier 1110 receiving the communication parameter from the serving base station. In some other examples, the device in the wireless network may be the serving base station, and transmitting the indication of the selected scheme may involve the scheme selection indicator 1120 transmitting an interference coordination message to the one or more neighboring base stations, where a payload of the interference coordination message is based on the dynamically selected interference coordination scheme.

In a first example, the dynamically selected interference coordination scheme may be an interfering beam fixation scheme, and transmitting the indication of the dynamically selected interference coordination scheme may involve the beam fixation component 1125 transmitting an indication of a beam fixation time interval or a beam fixation periodicity or both for the interfering beam fixation scheme. In a second example, the dynamically selected interference coordination scheme may be an interfering beam suppression scheme, and transmitting the indication of the dynamically selected interference coordination scheme may involve the beam suppression component 1130 transmitting an indication of a transmit power level or a transmit power reduction level or both for the interfering beam suppression scheme. In a third example, the dynamically selected interference coordination scheme may be an interfering beam avoidance scheme, and transmitting the indication of the dynamically selected interference coordination scheme may involve the beam avoidance component 1135 transmitting an indication of one or more beam indices to avoid for the interfering beam avoidance scheme.

Figure 12:
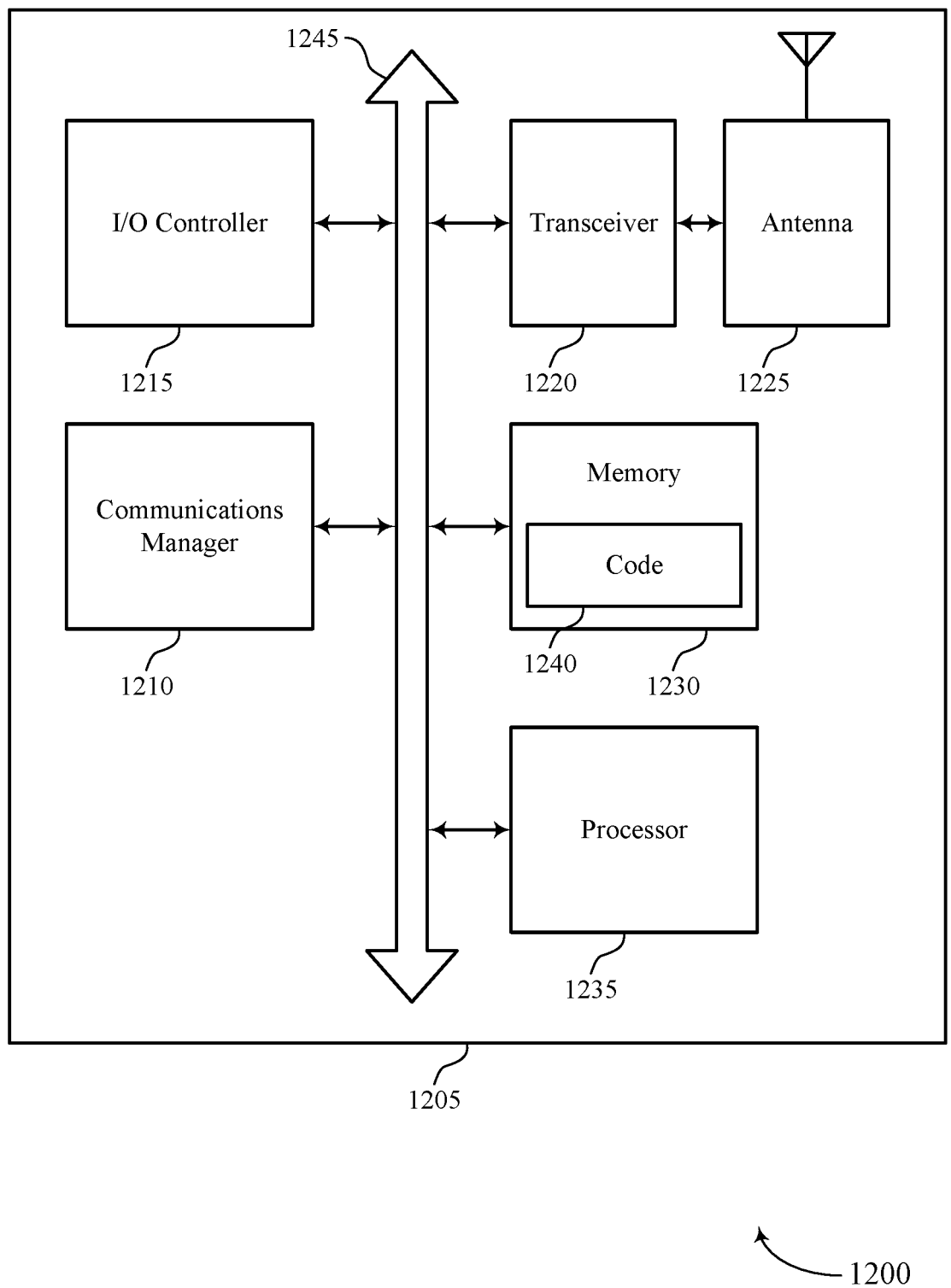
FIG. 12 shows a diagram of a system including a device that supports OTA interference coordination among base stations in accordance with one or more aspects of the present disclosure.

FIG. 12 shows a diagram of a system 1200 including a device 1205 that supports OTA interference coordination among base stations in accordance with one or more aspects of the present disclosure. The device 1205 may be an example of or include the components of device 905, device 1005, or a network entity (e.g., a base station 105, a network device, etc.) as described herein. The device 1205 may include components for bi-directional voice and data communications including components for transmitting and receiving communications, including a communications manager 1210, an I/O controller 1215, a transceiver 1220, an antenna 1225, memory 1230, and a processor 1235. These components may be in electronic communication via one or more buses (e.g., bus 1245).

The communications manager 1210 may determine a communication parameter of a UE served by a serving base station or of the serving base station or of both, dynamically select an interference coordination scheme for the serving base station and one or more neighboring base stations based on the communication parameter, and transmit an indication of the dynamically selected interference coordination scheme to a base station.

The I/O controller 1215 may manage input and output signals for the device 1205. The I/O controller 1215 may also manage peripherals not integrated into the device 1205. In some cases, the I/O controller 1215 may represent a physical connection or port to an external peripheral. In some cases, the I/O controller 1215 may utilize an operating system such as iOS®, ANDROID®, MS-DOS®, MS-WINDOWS®, OS/2®, UNIX®, LINUX®, or another known operating system. In other cases, the I/O controller 1215 may represent or interact with a modem, a keyboard, a mouse, a touchscreen, or a similar device. In some cases, the I/O controller 1215 may be implemented as part of a processor. In some cases, a user may interact with the device 1205 via the I/O controller 1215 or via hardware components controlled by the I/O controller 1215.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM and ROM. The memory 1230 may store computer-readable, computer-executable code 1240 including instructions that, when executed, cause the processor to perform various functions described herein. In some cases, the memory 1230 may contain, among other things, a BIOS which may control basic hardware or software operation such as the interaction with peripheral components or devices.

The processor 1235 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1235 may be configured to operate a memory array using a memory controller. In other cases, a memory controller may be integrated into the processor 1235. The processor 1235 may be configured to execute computer-readable instructions stored in a memory (e.g., the memory 1230) to cause the device 1205 to perform various functions (e.g., functions or tasks supporting OTA interference coordination among base stations).

The code 1240 may include instructions to implement aspects of the present disclosure, including instructions to support wireless communications. The code 1240 may be stored in a non-transitory computer-readable medium such as system memory or other type of memory. In some cases, the code 1240 may not be directly executable by the processor 1235 but may cause a computer (e.g., when compiled and executed) to perform functions described herein.

Figure 13:
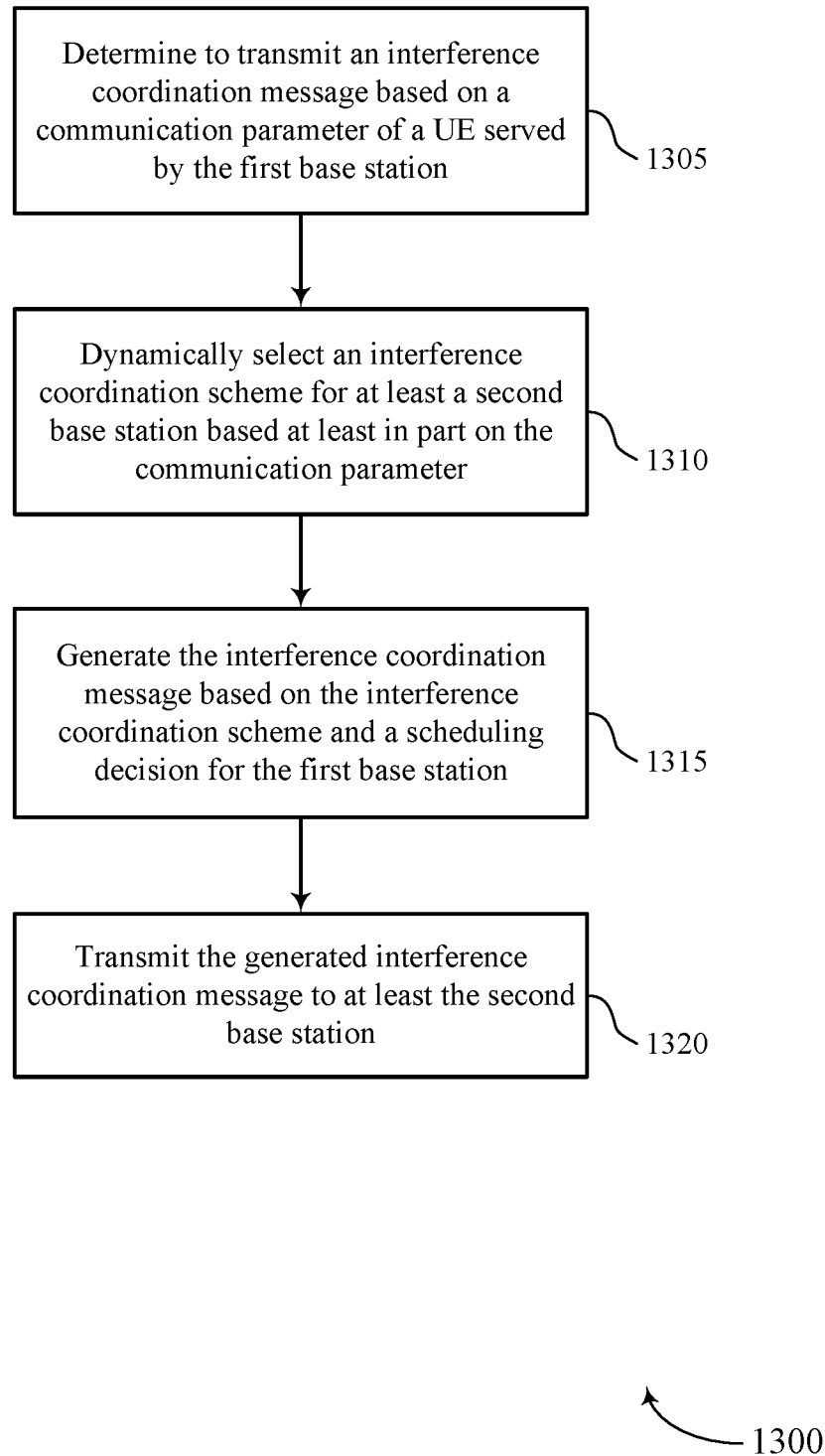
FIGS. 13 through 16 show flowcharts illustrating methods that support OTA interference coordination among base stations in accordance with one or more aspects of the present disclosure.

FIG. 13 shows a flowchart illustrating a method 1300 that supports OTA interference coordination among base stations in accordance with one or more aspects of the present disclosure. The operations of method 1300 may be implemented by a base station 105 or its components as described herein. For example, the operations of method 1300 may be performed by a communications manager as described with reference to FIGS. 5 through 8. In some examples, a base station may execute a set of instructions to control the functional elements of the base station to perform the functions described herein. Additionally or alternatively, a base station may perform aspects of the functions described herein using special-purpose hardware.

At 1305, the base station (i.e., the first base station) may determine to transmit an interference coordination message based on a communication parameter of a UE served by the first base station. The operations of 1305 may be performed according to the methods described herein. In some examples, aspects of the operations of 1305 may be performed by a determination component as described with reference to FIGS. 5 through 8.

At 1310, the base station may dynamically select an interference coordination scheme for at least a second base station based on the communication parameter. The operations of 1310 may be performed according to the methods described herein. In some examples, aspects of the operations of 1305 may be performed by a scheme identifier as described with reference to FIGS. 5 through 8.

At 1315, the base station may generate the interference coordination message based on the interference coordination scheme and a scheduling decision for the first base station. The operations of 1315 may be performed according to the methods described herein. In some examples, aspects of the operations of 1315 may be performed by a message generation component as described with reference to FIGS. 5 through 8.

At 1320, the base station may transmit the generated interference coordination message to at least the second base station. The operations of 1320 may be performed according to the methods described herein. In some examples, aspects of the operations of 1320 may be performed by an interference coordination messaging component as described with reference to FIGS. 5 through 8.

Figure 14:
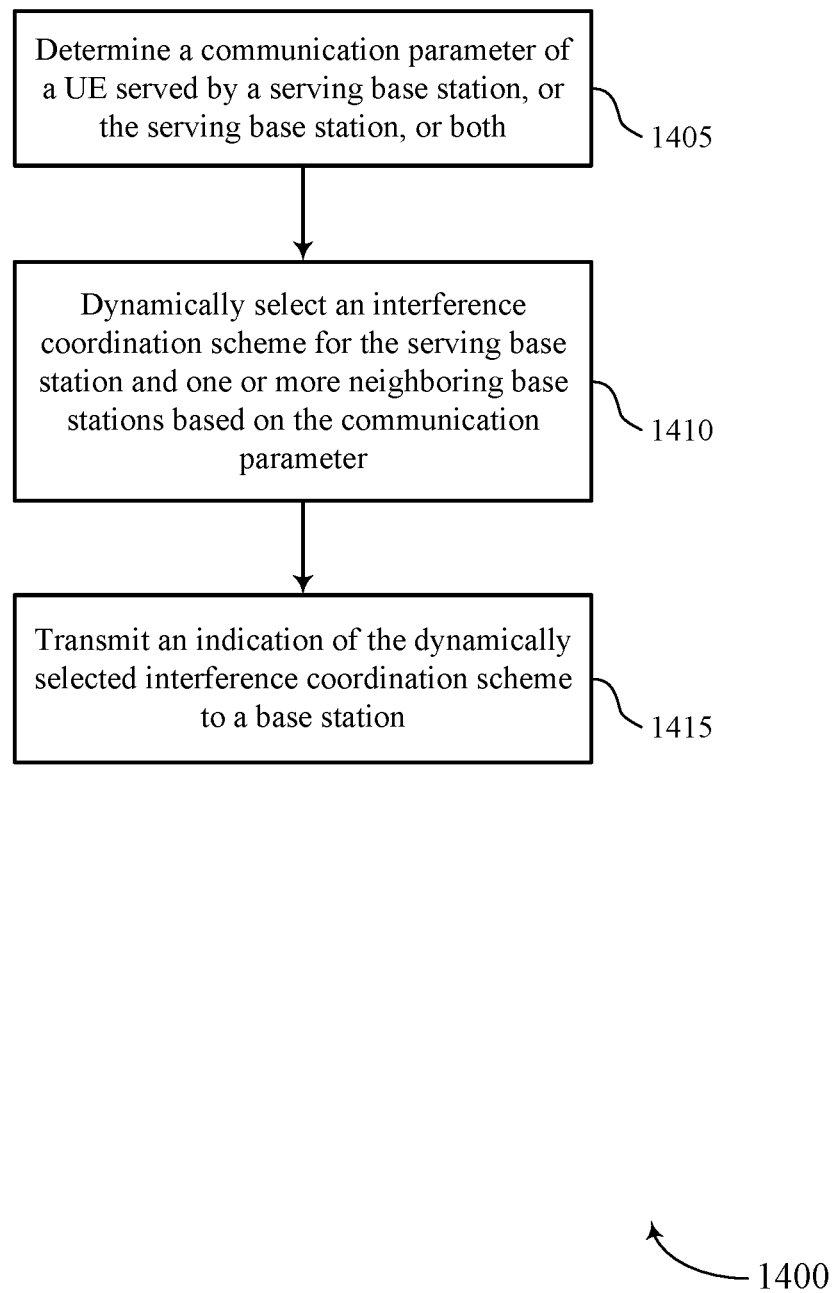

FIG. 14 shows a flowchart illustrating a method 1400 that supports OTA interference coordination among base stations in accordance with one or more aspects of the present disclosure. The operations of method 1400 may be implemented by a network entity or its components as described herein. For example, the operations of method 1400 may be performed by a communications manager as described with reference to FIGS. 9 through 12. In some examples, a network entity may execute a set of instructions to control the functional elements of the network entity to perform the functions described herein. Additionally or alternatively, a network entity may perform aspects of the functions described herein using special-purpose hardware.

At 1405, the network entity may determine a communication parameter of a UE served by a serving base station or of the serving base station or of both. The operations of 1405 may be performed according to the methods described herein. In some examples, aspects of the operations of 1405 may be performed by a parameter identifier as described with reference to FIGS. 9 through 12.

At 1410, the network entity may dynamically select an interference coordination scheme for the serving base station and one or more neighboring base stations based on the communication parameter. The operations of 1410 may be performed according to the methods described herein. In some examples, aspects of the operations of 1410 may be performed by a scheme selection component as described with reference to FIGS. 9 through 12.

At 1415, the network entity may transmit an indication of the dynamically selected interference coordination scheme to a base station. The operations of 1415 may be performed according to the methods described herein. In some examples, aspects of the operations of 1415 may be performed by a scheme selection indicator as described with reference to FIGS. 9 through 12.

Figure 15:
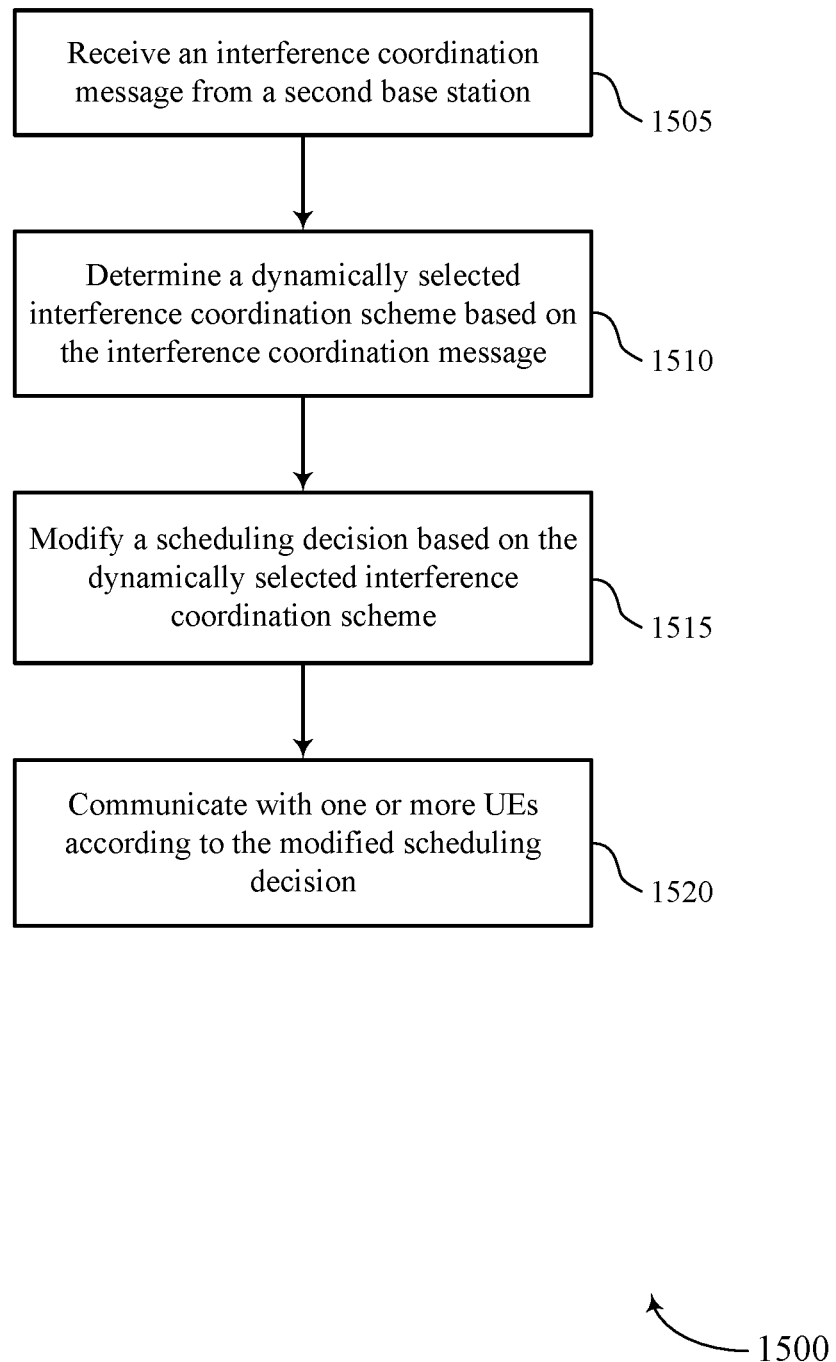

FIG. 15 shows a flowchart illustrating a method 1500 that supports OTA interference coordination among base stations in accordance with one or more aspects of the present disclosure. The operations of method 1500 may be implemented by a base station 105 or its components as described herein. For example, the operations of method 1500 may be performed by a communications manager as described with reference to FIGS. 5 through 8. In some examples, a base station may execute a set of instructions to control the functional elements of the base station to perform the functions described herein. Additionally or alternatively, a base station may perform aspects of the functions described herein using special-purpose hardware.

At 1505, the base station (i.e., the first base station) may receive an interference coordination message from a second base station. The operations of 1505 may be performed according to the methods described herein. In some examples, aspects of the operations of 1505 may be performed by an interference coordination reception component as described with reference to FIGS. 5 through 8.

At 1510, the base station may determine a dynamically selected interference coordination scheme based on the interference coordination message. The operations of 1510 may be performed according to the methods described herein. In some examples, aspects of the operations of 1510 may be performed by a scheme identifier as described with reference to FIGS. 5 through 8.

At 1515, the base station may modify a scheduling decision based on the dynamically selected interference coordination scheme. The operations of 1515 may be performed according to the methods described herein. In some examples, aspects of the operations of 1515 may be performed by a scheduling modifier as described with reference to FIGS. 5 through 8.

At 1520, the base station may communicate with one or more UEs according to the modified scheduling decision. The operations of 1520 may be performed according to the methods described herein. In some examples, aspects of the operations of 1520 may be performed by a communication component as described with reference to FIGS. 5 through 8.

Figure 16:
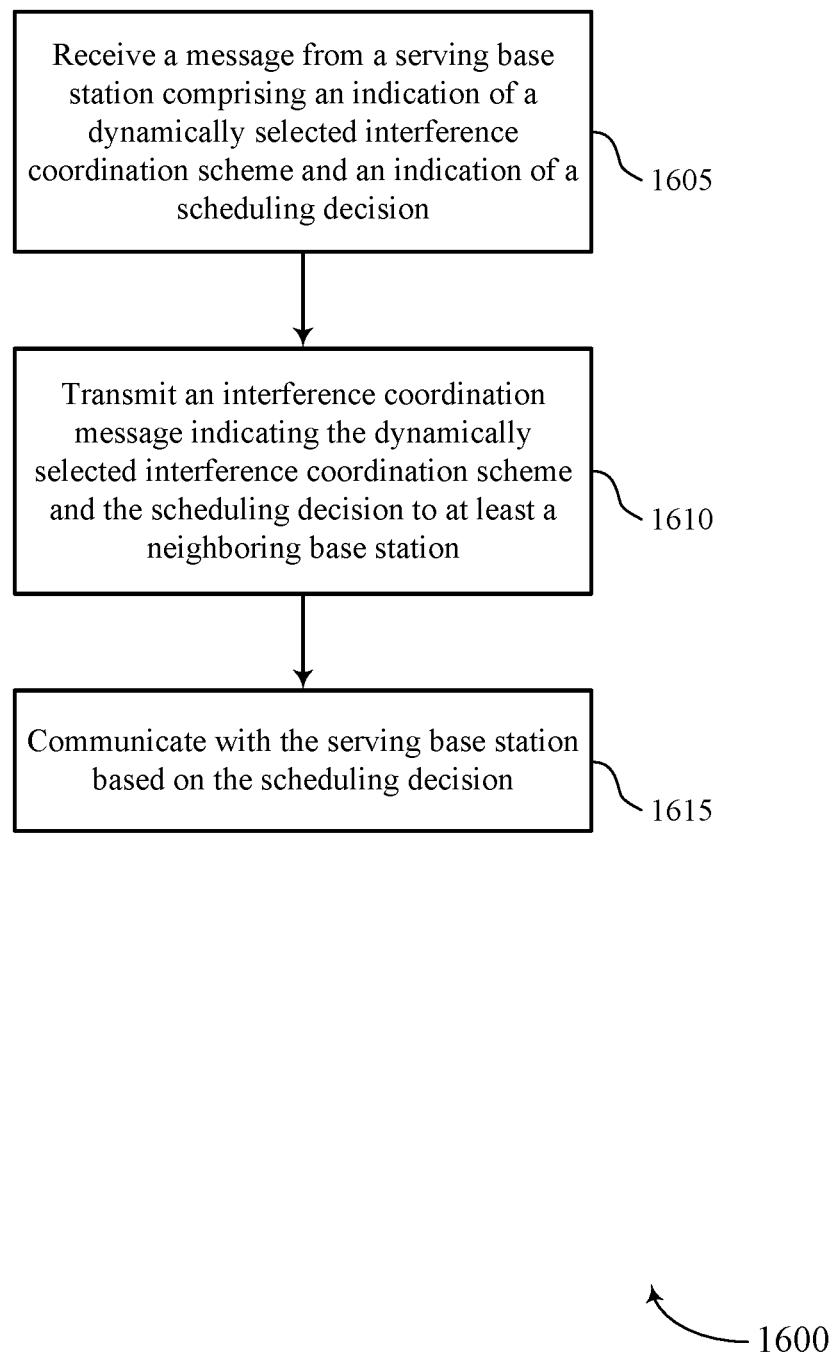

FIG. 16 shows a flowchart illustrating a method 1600 that supports OTA interference coordination among base stations in accordance with one or more aspects of the present disclosure. The operations of method 1600 may be implemented by a UE 115 or its components as described herein. In some examples, a UE may execute a set of instructions to control the functional elements of the UE to perform the functions described herein. Additionally or alternatively, a UE may perform aspects of the functions described herein using special-purpose hardware.

At 1605, the UE may receive a message from a serving base station including an indication of a dynamically selected interference coordination scheme and an indication of a scheduling decision. In some examples, the UE may trigger the message from the serving base station. For example, the UE may detect interference greater than a threshold level of interference from a neighboring base station and may transmit, to the serving base station, an interference message indicating the detected interference. The serving base station may transmit the message received at 1605 based on the interference message. The operations of 1605 may be performed according to the methods described herein. In some examples, aspects of the operations of 1605 may be performed by a receiver or transceiver of the UE.

At 1610, the UE may transmit an interference coordination message indicating the dynamically selected interference coordination scheme and the scheduling decision to at least a neighboring base station. In some examples, the UE may receive DCI at 1605 notifying the UE to transmit the interference coordination message to at least the neighboring base station, and the UE may transmit the interference coordination message at 1610 based on the DCI. In some other examples, the UE may receive the interference coordination message from the serving base station at 1605 and may relay the interference coordination message from the serving base station to at least the neighboring base station at 1610. The operations of 1610 may be performed according to the methods described herein. In some examples, aspects of the operations of 1610 may be performed by a transmitter or transceiver of the UE.

At 1615, the UE may communicate with the serving base station based on the scheduling decision. The operations of 1615 may be performed according to the methods described herein. In some examples, aspects of the operations of 1615 may be performed by a transmitter, receiver, or transceiver of the UE.

The following provides an overview of examples of the present disclosure:

EXAMPLE 1

A method for wireless communications at a first base station, comprising: determining to transmit an interference coordination message based at least in part on a communication parameter of a UE served by the first base station; dynamically selecting an interference coordination scheme for at least a second base station based at least in part on the communication parameter; generating the interference coordination message based at least in part on the interference coordination scheme and a scheduling decision for the first base station; and transmitting the generated interference coordination message to at least the second base station.

EXAMPLE 2

The method of example 1, wherein transmitting the generated interference coordination message comprises: broadcasting the generated interference coordination message to a plurality of base stations within a receiving range of the first base station, the plurality of base stations comprising at least the second base station.

EXAMPLE 3

The method of example 1, wherein transmitting the generated interference coordination message comprises: unicasting the generated interference coordination message to a designated base station group comprising at least the second base station.

EXAMPLE 4

The method of any one of examples 1 through 3, wherein generating the interference coordination message comprises: generating a payload of the interference coordination message based at least in part on the interference coordination scheme or the scheduling decision for the first base station or both, wherein the payload comprises an indication of the interference coordination scheme, or a trigger for interference coordination, or a start time for interference coordination, or an end time for interference coordination, or a time duration for interference coordination, or a beam fixation time period for at least the second base station, or a frequency resource for transmission by the first base station, or a transmit power level for at least the second base station, or a transmit power reduction level for at least the second base station, or a UE priority value for the UE, or a data traffic priority value for the UE, or a cell identifier for the first base station, or a base station identifier for the first base station, or a transmission/reception point identifier for the first base station, or one or more beam indexes, or a combination thereof.

EXAMPLE 5

The method of any one of examples 1 through 4, wherein transmitting the generated interference coordination message comprises: transmitting the generated interference coordination message via a wireless backhaul link, or an uplink channel, or a downlink channel, or a combination thereof.

EXAMPLE 6

The method of any one of examples 1 through 5, wherein the generated interference coordination message is transmitted based at least in part on a duplex capability of the first base station or a duplex capability of the second base station or both.

EXAMPLE 7

The method of any one of examples 1 through 6, wherein the communication parameter comprises a QoS level for a downlink transmission to the UE, the method further comprising: identifying that the QoS level for the downlink transmission to the UE is greater than a threshold QoS level, wherein determining to transmit the interference coordination message is based at least in part on the identifying.

EXAMPLE 8

The method of any one of examples 1 through 7, wherein the communication parameter comprises a priority value for the UE, the method further comprising: identifying that the priority value for the UE is greater than a threshold priority value, wherein the determining to transmit the interference coordination message is based at least in part on the identifying.

EXAMPLE 9

The method of any one of examples 1 through 8, wherein the communication parameter comprises a SIR or a SINK or both for the UE, the method further comprising: identifying that the SIR or the SINR or both for the UE are less than one or more threshold values, wherein the determining to transmit the interference coordination message is based at least in part on the identifying.

EXAMPLE 10

The method of any one of examples 1 through 9, wherein the communication parameter comprises location information for the UE, the method further comprising: identifying that the UE is greater than a threshold distance away from the first base station based at least in part on the location information, wherein the determining to transmit the interference coordination message is based at least in part on the identifying.

EXAMPLE 11

The method of any one of examples 1 through 10, further comprising: communicating with the UE according to the scheduling decision.

EXAMPLE 12

A method for wireless communications at a device in a wireless network, comprising: determining a communication parameter of a UE served by a serving base station or of the serving base station or of both; dynamically selecting an interference coordination scheme for the serving base station and one or more neighboring base stations based at least in part on the communication parameter; and transmitting an indication of the dynamically selected interference coordination scheme to a base station.

EXAMPLE 13

The method of example 12, wherein the dynamically selected interference coordination scheme comprises an interfering beam fixation scheme and transmitting the indication of the dynamically selected interference coordination scheme comprises: transmitting an indication of a beam fixation time interval or a beam fixation periodicity or both for the interfering beam fixation scheme.

EXAMPLE 14

The method of either one of examples 12 or 13, wherein the dynamically selected interference coordination scheme comprises an interfering beam suppression scheme and transmitting the indication of the dynamically selected interference coordination scheme comprises: transmitting an indication of a transmit power level or a transmit power reduction level or both for the interfering beam suppression scheme.

EXAMPLE 15

The method of any one of examples 12 through 14, wherein the dynamically selected interference coordination scheme comprises an interfering beam avoidance scheme and transmitting the indication of the dynamically selected interference coordination scheme comprises: transmitting an indication of one or more beam indices to avoid for the interfering beam avoidance scheme.

EXAMPLE 16

The method of any one of examples 12 through 15, wherein transmitting the indication of the dynamically selected interference coordination scheme comprises: transmitting an indication of whether to implement the dynamically selected interference coordination scheme, or a start time for implementing the dynamically selected interference coordination scheme, or an end time for implementing the dynamically selected interference coordination scheme, or a combination thereof.

EXAMPLE 17

The method of any one of examples 12 through 16, wherein the communication parameter comprises a QoS level for a downlink transmission from the serving base station to the UE, or a priority value for the UE, or a SIR for the UE, or a SINK for the UE, or location information for the UE relative to the serving base station, or a combination thereof.

EXAMPLE 18

The method of any one of examples 12 through 17, wherein the device in the wireless network comprises a network entity and the base station comprises the serving base station, the determining the communication parameter further comprising: receiving the communication parameter from the serving base station.

EXAMPLE 19

The method of any one of examples 12 through 17, wherein the device in the wireless network comprises the serving base station and transmitting the indication of the dynamically selected interference coordination scheme to the base station comprises: transmitting an interference coordination message to the one or more neighboring base stations, wherein a payload of the interference coordination message is based at least in part on the dynamically selected interference coordination scheme.

EXAMPLE 20

A method for wireless communications at a first base station, comprising: receiving an interference coordination message from a second base station; determining a dynamically selected interference coordination scheme based at least in part on the interference coordination message; modifying a scheduling decision based at least in part on the dynamically selected interference coordination scheme; and communicating with one or more user UEs according to the modified scheduling decision.

EXAMPLE 21

The method of example 20, wherein the dynamically selected interference coordination scheme comprises an interfering beam fixation scheme and modifying the scheduling decision comprises: operating using each communication beam of a set of communication beams for a configured number of TTIs based at least in part on a beam fixation time interval or a beam fixation periodicity or both indicated by the interference coordination message.

EXAMPLE 22

The method of example 21, wherein the set of communication beams comprises a subset of a plurality of communication beams operated by the first base station.

EXAMPLE 23

The method of example 20, wherein the dynamically selected interference coordination scheme comprises an interfering beam suppression scheme and modifying the scheduling decision comprises: modifying a transmit power for a set of communication beams based at least in part on a second scheduling decision for the second base station.

EXAMPLE 24

The method of example 23, wherein modifying the transmit power for the set of communication beams comprises: reducing the transmit power to zero, or to a transmit power level indicated by the interference coordination message, or by a transmit power reduction level indicated by the interference coordination message for the set of communication beams based at least in part on the dynamically selected interference coordination scheme.

EXAMPLE 25

The method of either one of examples 23 or 24, wherein modifying the transmit power for the set of communication beams comprises: determining one or more TTIs in which the second base station is scheduled to transmit to a specific UE according to the second scheduling decision, wherein the transmit power for the set of communication beams is modified for the one or more TTIs.

EXAMPLE 26

The method of any one of examples 23 through 25, wherein the set of communication beams comprises a subset of a plurality of communication beams operated by the first base station.

EXAMPLE 27

The method of example 20, wherein the dynamically selected interference coordination scheme comprises an interfering beam avoidance scheme and modifying the scheduling decision comprises: refraining from operating using a set of communication beams based at least in part on a second scheduling decision for the second base station.

EXAMPLE 28

The method of example 27, further comprising: determining the set of communication beams based at least in part on a cell identifier for the second base station, or a base station identifier for the second base station, or a transmission/reception point identifier for the second base station, or one or more beam indexes, or a combination thereof indicated by the interference coordination message.

EXAMPLE 29

The method of either of examples 27 or 28, wherein refraining from operating using the set of communication beams comprises: determining one or more TTIs in which the second base station is scheduled to transmit to a specific UE according to the second scheduling decision; and operating using a second set of communication beams distinct from the set of communication beams for the one or more TTIs.

EXAMPLE 30

The method of any one of examples 27 through 29, wherein the set of communication beams comprises a subset of a plurality of communication beams operated by the first base station.

EXAMPLE 31

A method for wireless communications at a UE, comprising: receiving a message from a serving base station comprising an indication of a dynamically selected interference coordination scheme and an indication of a scheduling decision; transmitting an interference coordination message indicating the dynamically selected interference coordination scheme and the scheduling decision to at least a neighboring base station; and communicating with the serving base station based at least in part on the scheduling decision.

EXAMPLE 32

The method of example 31, further comprising: detecting interference greater than a threshold level of interference from the neighboring base station; and transmitting, to the serving base station, an interference message indicating the detected interference, wherein receiving the message from the serving base station is based at least in part on transmitting the interference message.

EXAMPLE 33

The method of either one of examples 31 or 32, wherein receiving the message from the serving base station comprises: receiving, from the serving base station, downlink control information notifying the UE to transmit the interference coordination message to at least the neighboring base station, wherein transmitting the interference coordination message is based at least in part on the downlink control information.

EXAMPLE 34

The method of either one of examples 31 or 32, wherein: receiving the message from the serving base station comprises: receiving, from the serving base station, the interference coordination message; and transmitting the interference coordination message comprises: relaying the interference coordination message from the serving base station to at least the neighboring base station.

EXAMPLE 35

An apparatus for wireless communication comprising at least one means for performing a method of any one of examples 1 through 11.

EXAMPLE 36

An apparatus for wireless communication comprising a processor; and memory coupled to the processor, the processor and memory configured to perform a method of any one of examples 1 through 11.

EXAMPLE 37

A non-transitory computer-readable medium storing code for wireless communication comprising a processor, memory coupled to the processor, and instructions stored in the memory and executable by the processor to cause the apparatus to perform a method of any one of examples 1 through 11.

EXAMPLE 38

An apparatus for wireless communication comprising at least one means for performing a method of any one of examples 12 through 19.

EXAMPLE 39

An apparatus for wireless communication comprising a processor; and memory coupled to the processor, the processor and memory configured to perform a method of any one of examples 12 through 19.

EXAMPLE 40

A non-transitory computer-readable medium storing code for wireless communication comprising a processor, memory coupled to the processor, and instructions stored in the memory and executable by the processor to cause the apparatus to perform a method of any one of examples 12 through 19.

EXAMPLE 41

An apparatus for wireless communication comprising at least one means for performing a method of any one of examples 20 through 30.

EXAMPLE 42

An apparatus for wireless communication comprising a processor; and memory coupled to the processor, the processor and memory configured to perform a method of any one of examples 20 through 30.

EXAMPLE 43

A non-transitory computer-readable medium storing code for wireless communication comprising a processor, memory coupled to the processor, and instructions stored in the memory and executable by the processor to cause the apparatus to perform a method of any one of examples 20 through 30.

EXAMPLE 44

An apparatus for wireless communication comprising at least one means for performing a method of any one of examples 31 through 34.

EXAMPLE 45

An apparatus for wireless communication comprising a processor; and memory coupled to the processor, the processor and memory configured to perform a method of any one of examples 31 through 34.

EXAMPLE 46

A non-transitory computer-readable medium storing code for wireless communication comprising a processor, memory coupled to the processor, and instructions stored in the memory and executable by the processor to cause the apparatus to perform a method of any one of examples 31 through 34.

It should be noted that the methods described herein describe possible implementations, and that the operations may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example operation that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a first base station, comprising:
   determining to transmit an interference coordination message based at least in part on a communication parameter of a user equipment (UE) served by the first base station;
   dynamically selecting a beamforming interference coordination scheme from a plurality of beamforming interference coordination schemes for at least a second base station based at least in part on the communication parameter, the plurality of beamforming interference coordination schemes defining different configurations for communication beam usage at the second base station;

generating the interference coordination message based at least in part on the beamforming interference coordination scheme and a scheduling decision for the first base station; and transmitting the generated interference coordination message to at least the second base station.

2. The method of claim 1, the transmitting comprising:
broadcasting the generated interference coordination message to a plurality of base stations within a receiving range of the first base station, the plurality of base stations comprising at least the second base station.

3. The method of claim 1, the transmitting comprising:
unicasting the generated interference coordination message to a designated base station group comprising at least the second base station.

4. The method of claim 1, the generating comprising:
generating a payload of the interference coordination message based at least in part on the beamforming interference coordination scheme or the scheduling decision for the first base station or both, wherein the payload comprises an indication of the beamforming interference coordination scheme, or a trigger for interference coordination, or a start time for interference coordination, or an end time for interference coordination, or a time duration for interference coordination, or a beam fixation time period for at least the second base station, or a frequency resource for transmission by the first base station, or a transmit power level for at least the second base station, or a transmit power reduction level for at least the second base station, or a UE priority value for the UE, or a data traffic priority value for the UE, or a cell identifier for the first base station, or a base station identifier for the first base station, or a transmission/reception point identifier for the first base station, or one or more beam indexes, or a combination thereof.

5. The method of claim 1, the transmitting comprising:
transmitting the generated interference coordination message via a wireless backhaul link, or an uplink channel, or a downlink channel, or a combination thereof.

6. The method of claim 1, the communication parameter comprising a quality of service level for a downlink transmission to the UE, the method further comprising:
identifying that the quality of service level for the downlink transmission to the UE is greater than a threshold quality of service level, wherein determining to transmit the interference coordination message is based at least in part on the identifying.

7. The method of claim 1, the communication parameter comprising a priority value for the UE, the method further comprising:
identifying that the priority value for the UE is greater than a threshold priority value, wherein the determining to transmit the interference coordination message is based at least in part on the identifying.

8. The method of claim 1, the communication parameter comprising a signal-to-interference ratio or a signal-to-interference-plus-noise ratio or both for the UE, the method further comprising:
identifying that the signal-to-interference ratio or the signal-to-interference-plus-noise ratio or both for the UE are less than one or more threshold values, wherein the determining to transmit the interference coordination message is based at least in part on the identifying.

9. The method of claim 1, the communication parameter comprising location information for the UE, the method further comprising:
identifying that the UE is greater than a threshold distance away from the first base station based at least in part on the location information, wherein the determining to transmit the interference coordination message is based at least in part on the identifying.

10. The method of claim 1, further comprising:
communicating with the UE according to the scheduling decision.

11. A method for wireless communications at a device in a wireless network, comprising:
determining a communication parameter of a user equipment (UE) served by a serving base station or of the serving base station or of both;

dynamically selecting a beamforming interference coordination scheme from a plurality of beamforming interference coordination schemes for the serving base station and one or more neighboring base stations based at least in part on the communication parameter, the plurality of beamforming interference coordination schemes defining different configurations for communication beam usage at the one or more neighboring base stations; and transmitting an indication of the dynamically selected beamforming interference coordination scheme to a base station.

12. The method of claim 11, the dynamically selected beamforming interference coordination scheme comprising an interfering beam fixation scheme and the transmitting comprising:
transmitting an indication of a beam fixation time interval or a beam fixation periodicity or both for the interfering beam fixation scheme.

13. The method of claim 11, the dynamically selected beamforming interference coordination scheme comprising an interfering beam suppression scheme and the transmitting comprising:
transmitting an indication of a transmit power level or a transmit power reduction level or both for the interfering beam suppression scheme.

14. The method of claim 11, the dynamically selected beamforming interference coordination scheme comprising an interfering beam avoidance scheme and the transmitting comprising:
transmitting an indication of one or more beam indices to avoid for the interfering beam avoidance scheme.

15. The method of claim 11, the transmitting comprising:
transmitting an indication of whether to implement the dynamically selected beamforming interference coordination scheme, or a start time for implementing the dynamically selected beamforming interference coordination scheme, or an end time for implementing the dynamically selected beamforming interference coordination scheme, or a combination thereof.

16. The method of claim 11, wherein the communication parameter comprises a quality of service level for a downlink transmission from the serving base station to the UE, or a priority value for the UE, or a signal-to-interference ratio for the UE, or a signal-to-interference-plus-noise ratio for the UE, or location information for the UE relative to the serving base station, or a combination thereof.

17. The method of claim 11, the device in the wireless network comprising a network entity and the base station comprising the serving base station, the determining further comprising:
receiving the communication parameter from the serving base station.

18. The method of claim 11, the device in the wireless network comprising the serving base station and the transmitting comprising:
transmitting an interference coordination message to the one or more neighboring base stations, wherein a payload of the interference coordination message is based at least in part on the dynamically selected beamforming interference coordination scheme.

19. A method for wireless communications at a first base station, comprising:
receiving an interference coordination message from a second base station;
determining a dynamically selected beamforming interference coordination scheme from a plurality of beamforming interference coordination schemes based at least in part on the interference coordination message, the plurality of beamforming interference coordination schemes defining different configurations for communication beam usage at the first base station;
modifying a scheduling decision based at least in part on the dynamically selected beamforming interference coordination scheme; and
communicating with one or more user equipments (UEs) according to the modified scheduling decision.

20. The method of claim 19, the dynamically selected beamforming interference coordination scheme comprising an interfering beam fixation scheme and the modifying comprising:
operating using each communication beam of a set of communication beams for a configured number of transmission time intervals based at least in part on a beam fixation time interval or a beam fixation periodicity or both indicated by the interference coordination message.

21. The method of claim 19, the dynamically selected beamforming interference coordination scheme comprising an interfering beam suppression scheme and the modifying comprising:
modifying a transmit power for a set of communication beams based at least in part on a second scheduling decision for the second base station.

22. The method of claim 21, the modifying the transmit power for the set of communication beams comprising:
reducing the transmit power to zero, or to a transmit power level indicated by the interference coordination message, or by a transmit power reduction level indicated by the interference coordination message for the set of communication beams based at least in part on the dynamically selected beamforming interference coordination scheme.

23. The method of claim 21, the modifying the transmit power for the set of communication beams comprising:
determining one or more transmission time intervals in which the second base station is scheduled to transmit to a specific UE according to the second scheduling decision, wherein the transmit power for the set of communication beams is modified for the one or more transmission time intervals.

24. The method of claim 19, the dynamically selected beamforming interference coordination scheme comprising an interfering beam avoidance scheme and the modifying comprising:
refraining from operating using a set of communication beams based at least in part on a second scheduling decision for the second base station.

25. The method of claim 24, further comprising:
determining the set of communication beams based at least in part on a cell identifier for the second base station, or a base station identifier for the second base station, or a transmission/reception point identifier for the second base station, or one or more beam indexes, or a combination thereof indicated by the interference coordination message.

26. The method of claim 24, the refraining comprising:
determining one or more transmission time intervals in which the second base station is scheduled to transmit to a specific UE according to the second scheduling decision; and
operating using a second set of communication beams distinct from the set of communication beams for the one or more transmission time intervals.

27. A method for wireless communications at a user equipment (UE), comprising:
receiving a message from a serving base station comprising an indication of a dynamically selected beamforming interference coordination scheme from a plurality of beamforming interference coordination schemes and an indication of a scheduling decision, the plurality of beamforming interference coordination schemes defining different configurations for communication beam usage at a neighboring base station;
transmitting an interference coordination message indicating the dynamically selected beamforming interference coordination scheme and the scheduling decision to at least the neighboring base station; and
communicating with the serving base station based at least in part on the scheduling decision.

28. The method of claim 27, further comprising:
detecting interference greater than a threshold level of interference from the neighboring base station; and
transmitting, to the serving base station, an interference message indicating the detected interference, wherein receiving the message from the serving base station is based at least in part on transmitting the interference message.

29. The method of claim 27, the receiving comprising:
receiving, from the serving base station, downlink control information notifying the UE to transmit the interference coordination message to at least the neighboring base station, wherein transmitting the interference coordination message is based at least in part on the downlink control information.

30. The method of claim 27, the receiving comprising:
receiving, from the serving base station, the interference coordination message; and
the transmitting comprising:
relaying the interference coordination message from the serving base station to at least the neighboring base station.

* * * * *